US009842222B2

(12) United States Patent
Dhuse et al.

(10) Patent No.: US 9,842,222 B2
(45) Date of Patent: *Dec. 12, 2017

(54) SECURELY REBUILDING AN ENCODED DATA SLICE

(75) Inventors: Greg Dhuse, Chicago, IL (US); Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 49 days.

This patent is subject to a terminal disclaimer.

(21) Appl. No.: 13/463,991

(22) Filed: May 4, 2012

(65) Prior Publication Data

US 2012/0311345 A1 Dec. 6, 2012
US 2014/0108815 A9 Apr. 17, 2014

Related U.S. Application Data

(63) Continuation-in-part of application No. 12/862,887, filed on Aug. 25, 2010.
(Continued)

(51) Int. Cl.
*G06F 11/30* (2006.01)
*G06F 21/62* (2013.01)
(Continued)

(52) U.S. Cl.
CPC ........ *G06F 21/6227* (2013.01); *G06F 3/0604* (2013.01); *G06F 3/067* (2013.01); *G06F 3/0644* (2013.01); *G06F 11/10* (2013.01); *G06F 11/1076* (2013.01); *G06F 11/2089* (2013.01); *G06F 12/1408* (2013.01); *G06F 21/602* (2013.01); *G06F 21/6218* (2013.01); *G06F 21/64* (2013.01); *H04L 9/085* (2013.01);
(Continued)

(58) Field of Classification Search
CPC ............... G06F 21/60; G06F 17/30194; G06F 21/6218; H04L 63/20; H04L 63/102
USPC ........................................................ 713/189
See application file for complete search history.

(56) References Cited

U.S. PATENT DOCUMENTS 4,092,732 A  5/1978  Ouchi
5,454,101 A  9/1995  Mackay et al.
(Continued)

OTHER PUBLICATIONS

International Search Report and Written Opinion; International Application No. PCT/US12/040033; dated Sep. 7, 2012; 8 pgs.
(Continued)

*Primary Examiner* — Evans Desrosiers
(74) *Attorney, Agent, or Firm* — Garlick & Markison; Timothy W. Markison; Edward J. Marshall

(57) ABSTRACT

A method begins by a requesting entity issuing a rebuild request regarding an encoded data slice to at least some of a set of distributed storage (DS) units. In response to the rebuild request, the method continues with each of at least some of the DS units of the set of DS units generating a partial slice corresponding to the encoded data slice to be rebuilt based on one of a set of encoded data slices stored by the respective DS unit to produce an array of partial slices. The method continues with the at least some of the DS units encrypting the array of partial slices using a set of encryption keys to produce an array of encrypted partial slices. The method continues with the requesting entity rebuilding the encoded data slice from the array of encrypted partial slices.

15 Claims, 20 Drawing Sheets

Related U.S. Application Data

(60) Provisional application No. 61/493,820, filed on Jun. 6, 2011.

(51) Int. Cl.

| | | |
|---|---|---|
| *G06F 12/14* | (2006.01) | |
| *G06F 11/10* | (2006.01) | |
| *G06F 3/06* | (2006.01) | |
| *G06F 11/20* | (2006.01) | |
| *G06F 21/64* | (2013.01) | |
| *G06F 21/60* | (2013.01) | |
| *H04L 9/08* | (2006.01) | |
| *G06F 17/30* | (2006.01) | |
| *G06F 15/173* | (2006.01) | |

(52) U.S. Cl.
CPC ...... *H04L 9/0861* (2013.01); *G06F 15/17331* (2013.01); *G06F 17/30283* (2013.01); *G06F 2212/263* (2013.01); *G06F 2221/2107* (2013.01); *H04L 2209/24* (2013.01); *H04L 2209/34* (2013.01)

(56) References Cited

U.S. PATENT DOCUMENTS

| | | | |
|---|---|---|---|
| 5,485,474 A * | 1/1996 | Rabin | G06F 11/004 714/762 |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A * | 11/1999 | Garay | H04L 9/302 380/30 |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 8,132,073 B1 * | 3/2012 | Bowers et al. | 714/755 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2010/0266119 A1 | 10/2010 | Leggette et al. | |
| 2011/0107026 A1 * | 5/2011 | Quigley et al. | 711/114 |
| 2011/0126295 A1 * | 5/2011 | Resch | 726/27 |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

(56) References Cited

OTHER PUBLICATIONS

Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.
European Patent Office; Extended European Search Report; EP Application No. 12797604.1; dated Nov. 27, 2014; 6 pgs.
Rao; Joint encryption and error correction schemes; Proceedings of the 11th Annual International Symposium on Computer Architecture; ISCA '84; Jan. 1, 1984; pp. 240-241.

* cited by examiner

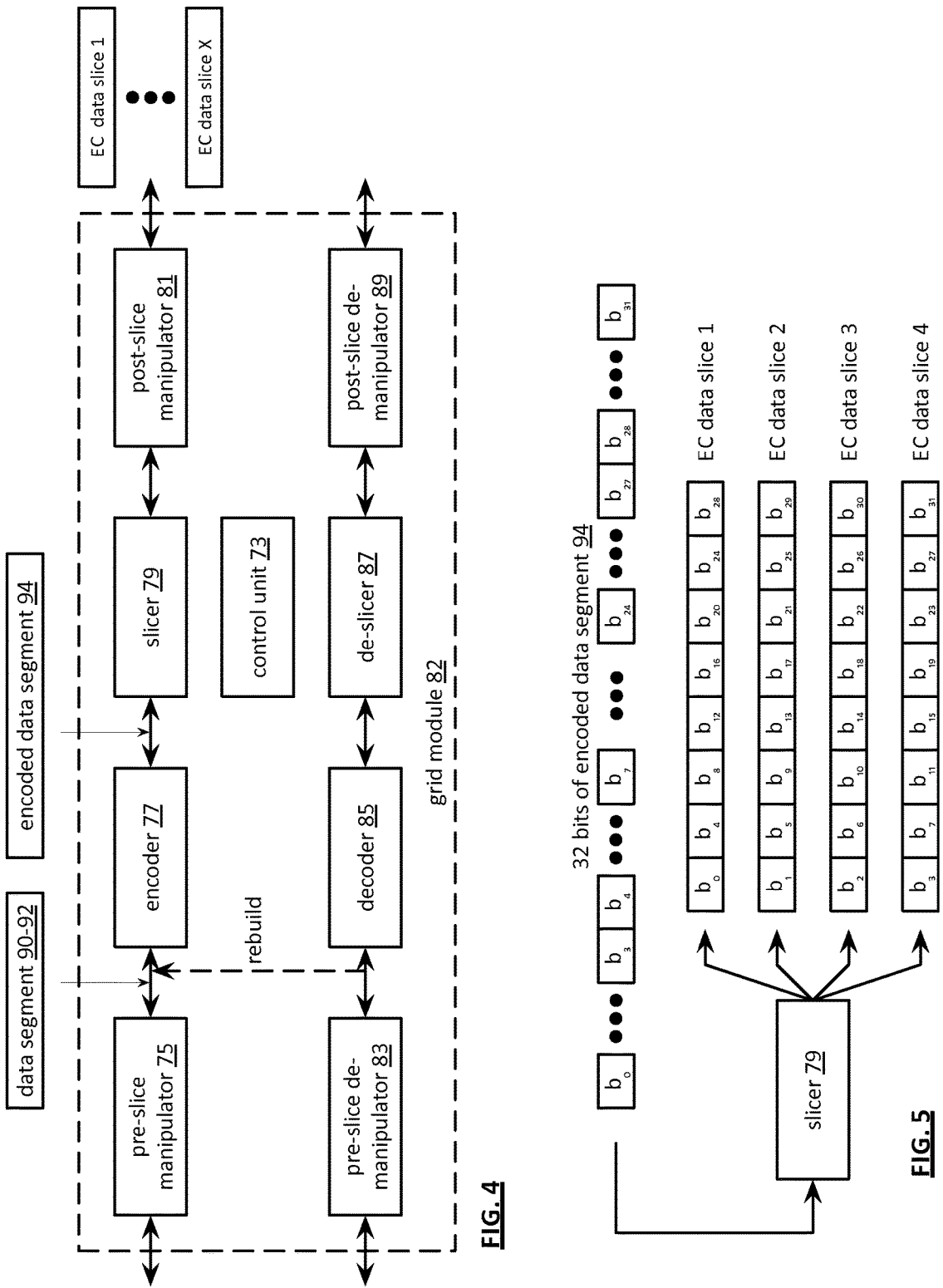

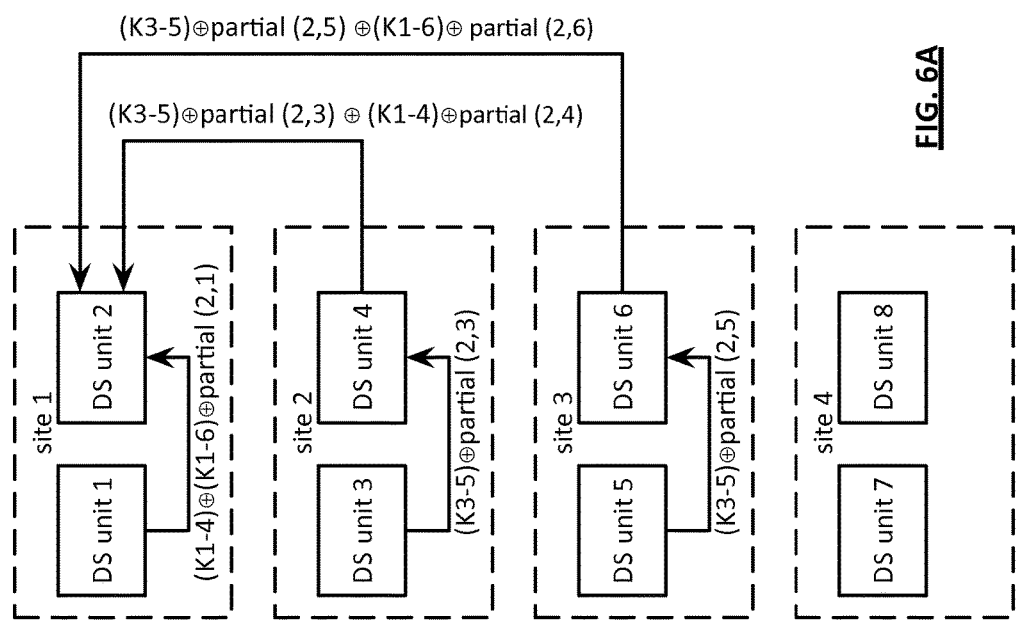

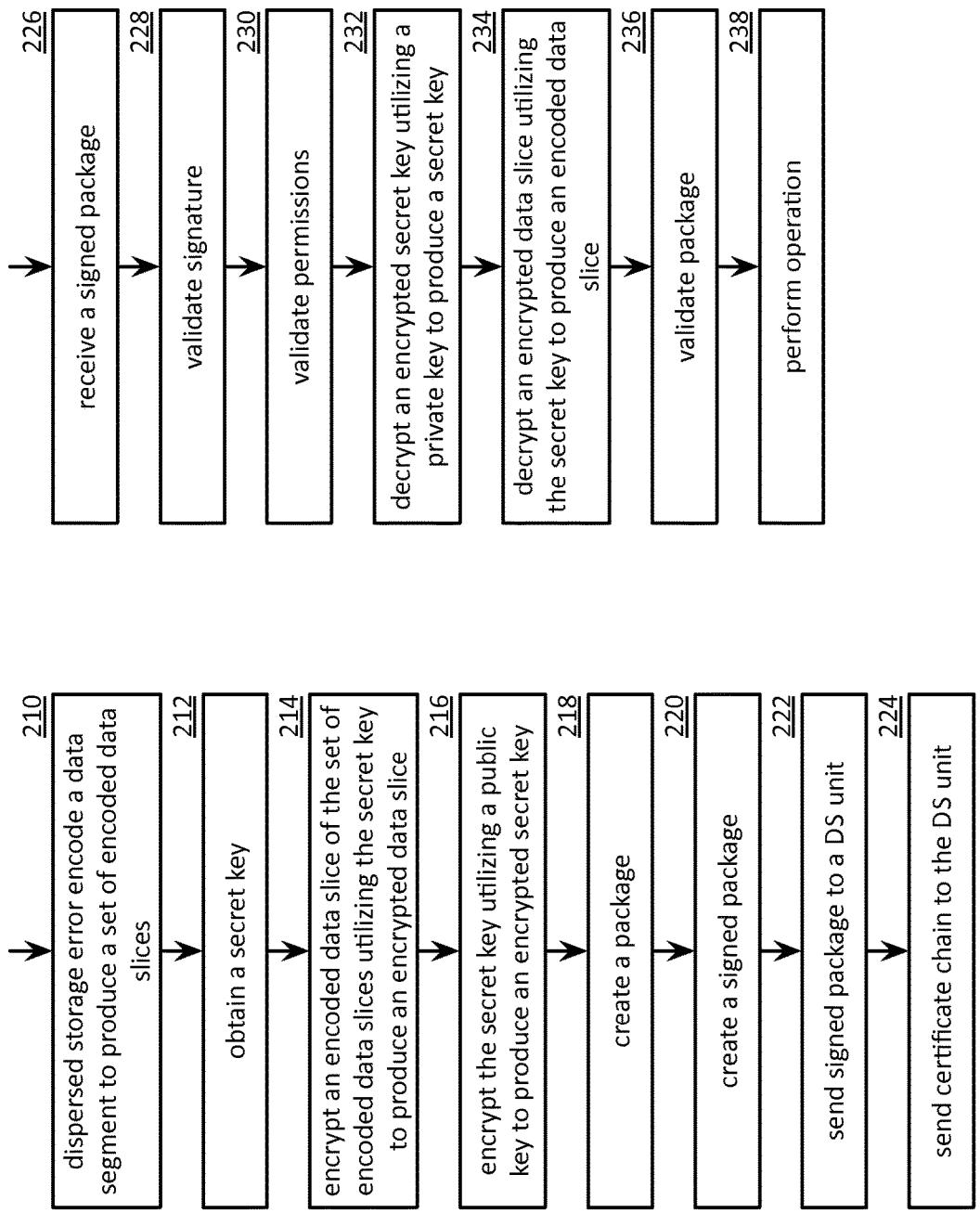

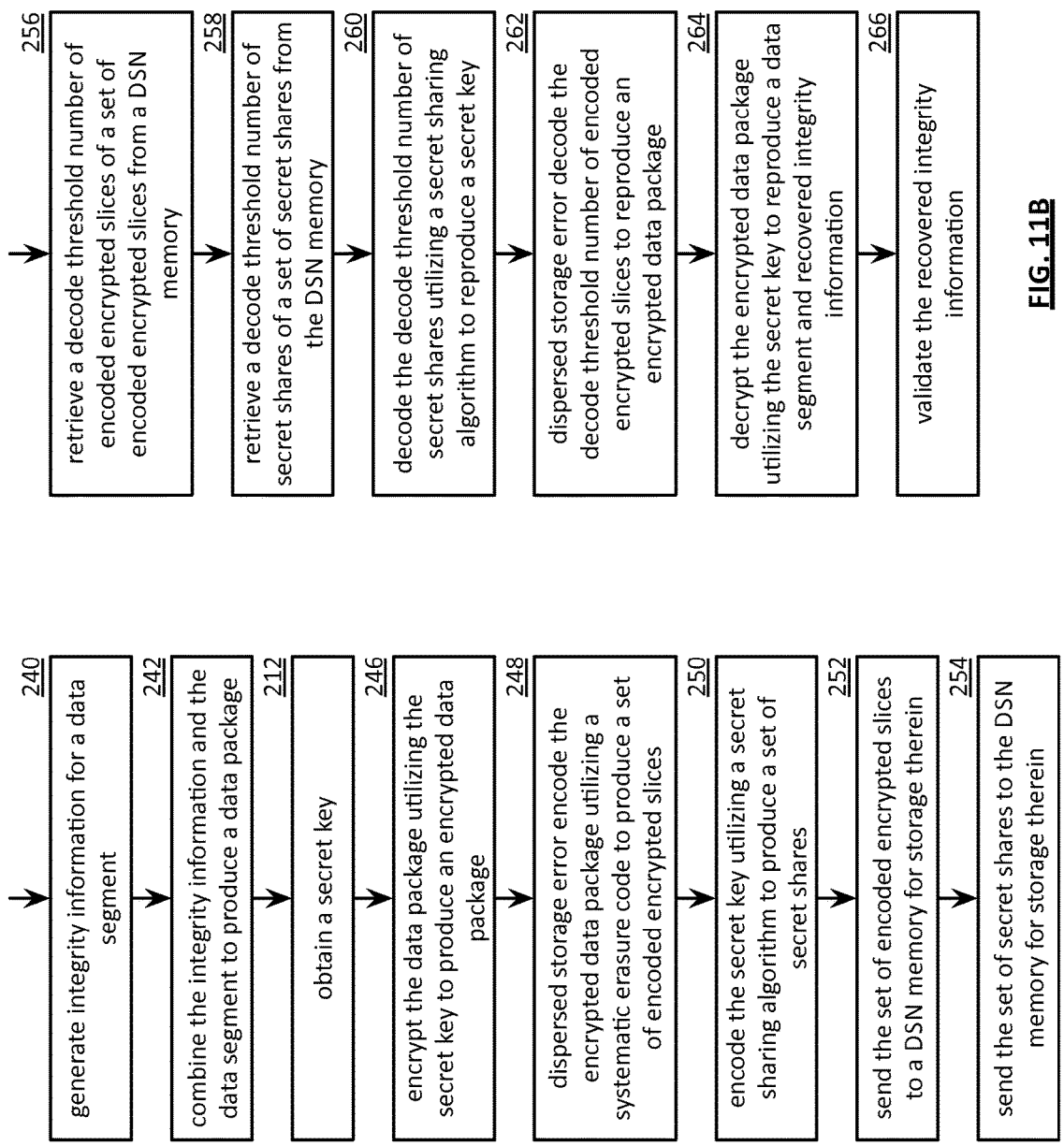

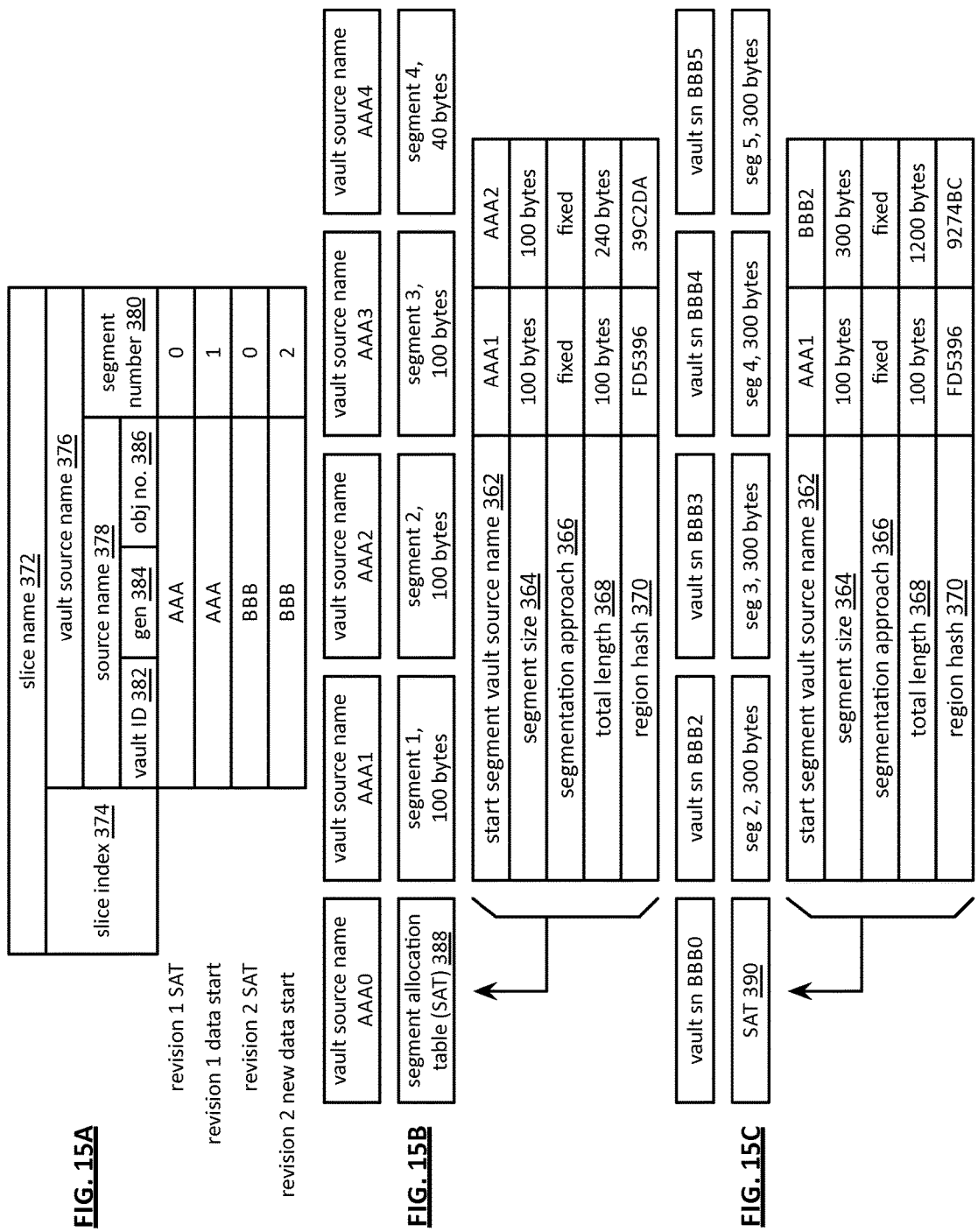

SECURELY REBUILDING AN ENCODED DATA SLICE

CROSS REFERENCE TO RELATED PATENTS

The present U.S. Utility Patent Application claims priority pursuant to 35 U.S.C. §119(e) to U.S. Provisional Application No. 61/493,820, entitled "Data Security in a Dispersed Storage Network," filed Jun. 6, 2011, which is incorporated herein by reference in its entirety and made part of the present U.S. Utility Patent Application for all purposes and is further claiming priority under 35 U.S.C. §120, as a continuation-in-part, to U.S. Utility Patent Application having a Serial No. of Ser. No. 12/862,887, entitled "DISPERSED STORAGE NETWORK DATA SLICE INTEGRITY VERIFICATION", and a filing date of Aug. 25, 2010.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing systems and more particularly to data storage solutions within such computing systems.

Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming, etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the present invention;

FIG. 5 is a diagram of an example embodiment of error coded data slice creation in accordance with the present invention;

FIG. 6A is a schematic block diagram of another embodiment of a computing system in accordance with the present invention;

FIG. 6B is a table illustrating an example of a dispersed storage (DS) unit key pair to DS unit key assignment table in accordance with the present invention;

FIG. 10A is a flowchart illustrating an example of encrypting an encoded data slice in accordance with the present invention;

FIG. 10B is a flowchart illustrating an example of decrypting an encrypted data slice in accordance with the present invention;

FIG. 11A is a flowchart illustrating an example of storing a data segment in accordance with the present invention;

FIG. 11B is a flowchart illustrating an example of retrieving a data segment in accordance with the present invention;

FIG. 15A is a diagram illustrating an example of a slice name format in accordance with the present invention;

FIG. 15B is a diagram illustrating an example of data segmentation in accordance with the present invention;

FIG. 15C is a diagram illustrating another example of data segmentation in accordance with the present invention;

DETAILED DESCRIPTION OF THE INVENTION

Figure 1:
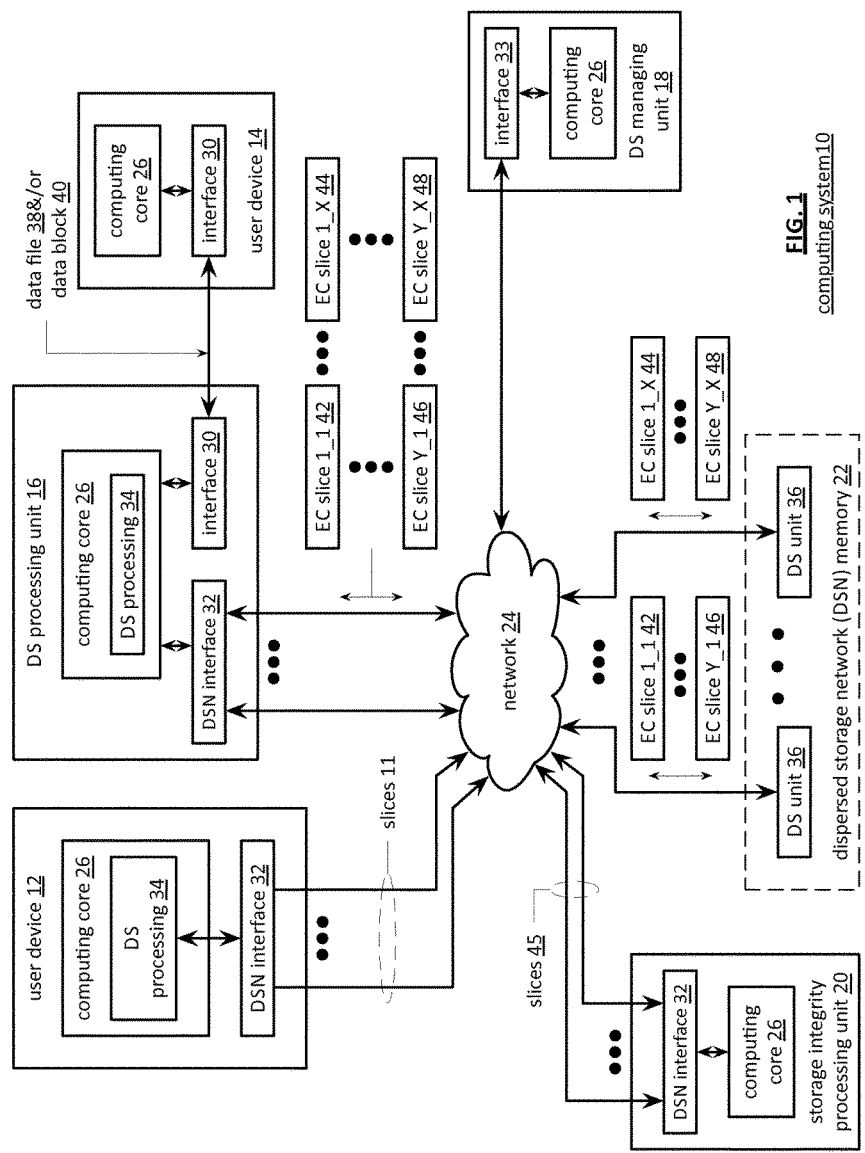
FIG. 1 is a schematic block diagram of an embodiment of a computing system in accordance with the present invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.).

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 indirectly and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing unit 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding slice EC 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
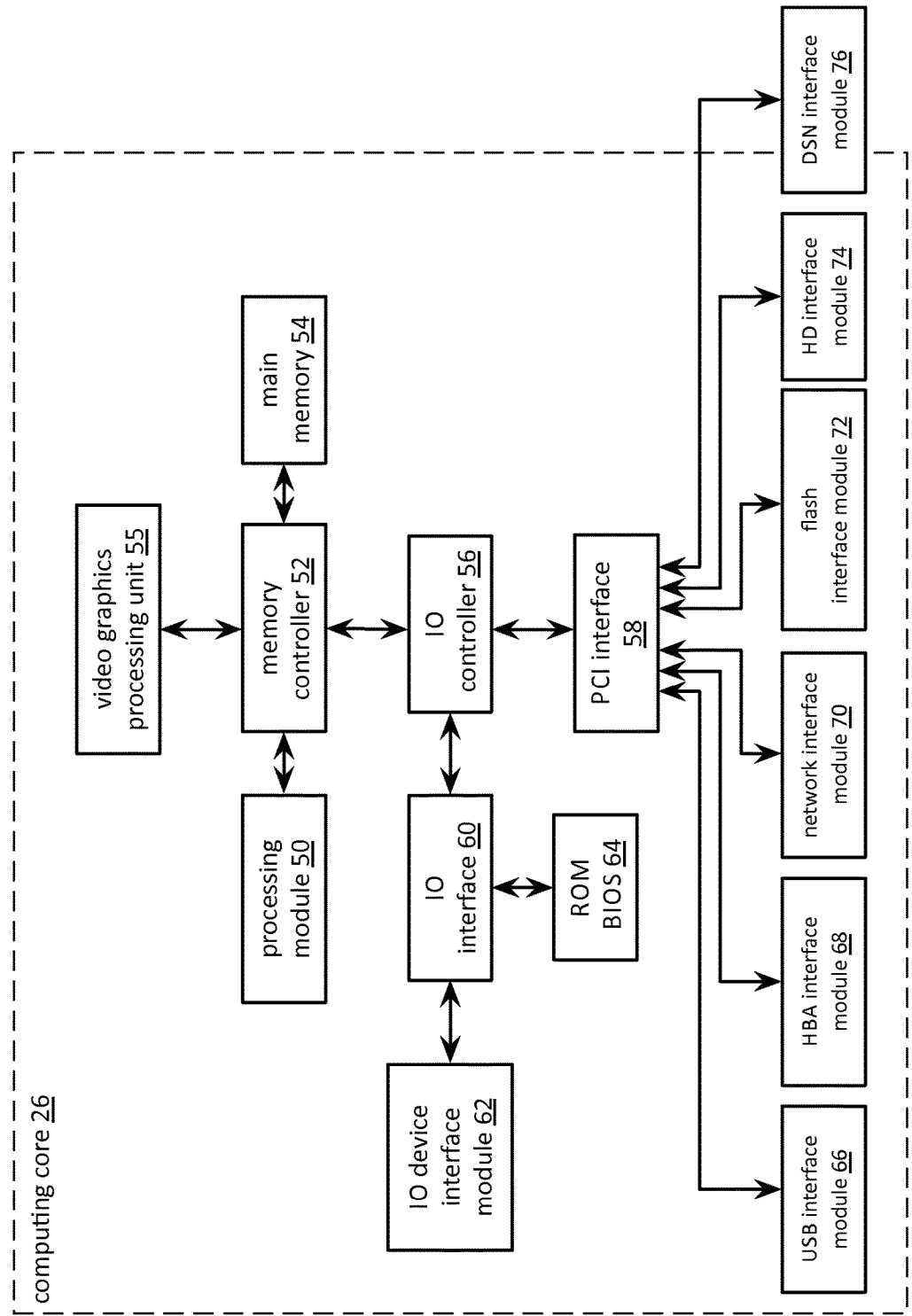
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
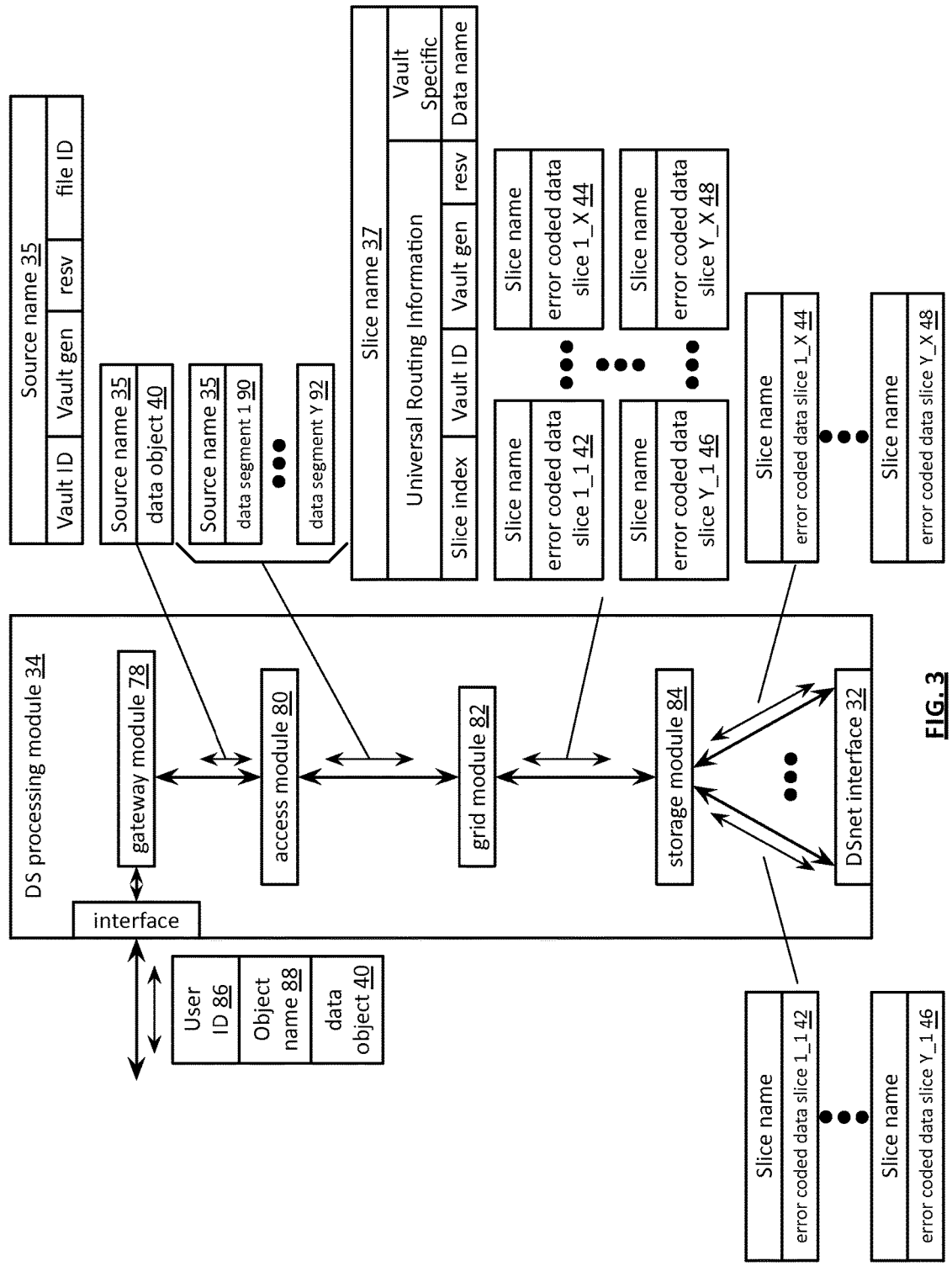
FIG. 3 is a schematic block diagram of an embodiment of a distributed storage processing unit in accordance with the present invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the DS managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

FIG. 6A is a schematic block diagram of another embodiment of a computing system. The system includes a plurality of sites 1-4 that includes, in totality, a set of dispersed storage (DS) units associated with a set of encoded data slices. The set of encoded data slices is produced by dispersed storage error encoding a data segment. Each such site of the plurality of sites 1-4 includes at least one DS unit of the set of DS units, wherein the at least one DS unit stores a corresponding encoded data slice of the set of encoded data slices. For example, site 1 includes DS units 1-2, site 2 includes DS units 3-4, site 3 includes DS units 5-6, and site 4 includes DS units 7-8 when a pillar width is 8.

Rebuilding an encoded data slice requires at least a decode threshold number of encoded data slices of a set of encoded data slices associated with the encoded data slice to be rebuilt. For example, DS unit 2 requests a decode threshold number of encoded data slices from DS units 1, 3, 4, 5, and 6 when DS unit 2 is associated with an encoded data slice to be rebuilt and the decode threshold number is 5. Each DS unit of DS units 1, 3, 4, 5, and 6 sends a corresponding encoded data slice (e.g., DS unit 4 sends a pillar 4 encoded data slice) to DS unit 2. DS unit 2 receives the decode threshold number of encoded data slices and dispersed storage error decodes the decode threshold number of encoded data slices to reproduce a data segment. DS unit 2 dispersed storage error encodes the data segment to produce the set of encoded data slices. DS unit 2 selects the encoded data slice associated with DS unit 2 (e.g., pillar 2) as a copy of the encoded data slice to be rebuilt and stores the encoded data slice to be rebuilt.

Alternatively, DS unit 2 requests a decode threshold number of slice partials from DS units 1, 3, 4, 5, and 6 when DS unit 2 is associated with the encoded data slice to be rebuilt and the decode threshold number is 5. Each DS unit of DS units 1, 3, 4, 5, and 6 generates a slice partial (e.g., DS unit 4 generates a pillar 4 slice partial) based on rebuilding parameters and an encoded data slice associated with the DS unit. The rebuilding parameters includes one or more of the dispersed storage error coding parameters, such as a pillar width (e.g., 8), a decode threshold (e.g., 5), a pillar index to be rebuilt (e.g., pillar 2), the rebuilding participant list (e.g., DS units 1, 3, 4, 5, and 6), a rebuilding topology (e.g., DS unit 1 to DS unit 2, DS unit 3 to DS unit 4 to DS unit 2, DS unit 5 to DS unit 6 to DS unit 2), an encoding matrix, a DS unit pair key indicator, a DS unit key assignment, Diffie Hellman parameters, and an encryption algorithm indicator. For example, DS unit 4 generates partial (2,4)=(inverted square matrix of an encoding matrix utilizing participating rows 1, 3, 4, 5, 6)*(a data matrix with a pillar 4 encoded data slice in a third row)*(a second row of the encoding matrix corresponding to a pillar number of the encoded data slice to be rebuilt).

Next, each DS unit of DS units 1, 3, 4, 5, and 6 encrypts the slice partial corresponding to the DS unit utilizing an encryption function, wherein the encryption function utilizes an encryption algorithm and one or more keys. The encryption algorithm includes performing an exclusive or (XOR) logical function on the slice partial and the one or more keys. Each key of the one or more keys may be utilized an even number of times by the DS unit and at least one other DS unit of DS units 1, 3, 4, 5, and 6 to enable subsequent decryption (e.g., XOR) when the decode threshold number of slice partials are combined to reproduce the encoded data slice to be rebuilt. For instance, each DS unit may utilize each possible key enabled for use by the DS unit. Each key of the one or more keys may be obtained by one or more of a retrieval request, a message, and generation. For example, DS unit 3 utilizes a shared secret key (K3-5) shared between DS units 3 and 5, DS unit 5 utilizes the shared secret key between DS units 3 and 5, DS unit 4 utilizes a shared secret key (K1-4) between DS units 1 and 4, DS unit 6 utilizes a shared secret key (K1-6) between DS units 1 and 6, and DS unit 1 utilizes the shared secret key between DS units 1 and 4 the shared secret key between DS units 1 and 6 in accordance with DS unit pair key indicators and a DS unit key assignment of the rebuilding parameters.

Each DS unit may generate one or more keys associated with one or more DS unit pairings utilizing a Diffie Hellman method and Diffie Hellman parameters of the rebuilding parameters. As an instance of encrypting a slice partial corresponding to DS unit 3, DS unit 3 produces an encrypted slice partial in accordance with a formula: (K3-5) ⊕ partial (2,3). As an instance of encrypting a slice partial corresponding to DS unit 1, DS unit 1 produces an encrypted slice partial in accordance with a formula: (K1-4)⊕(K1-6)| partial (2,1). As an instance of encrypting a slice partial corresponding to DS unit 4, DS unit 4 produces an encrypted slice partial in accordance with a formula: (K1-4) ⊕ partial (2,4).

Next, each DS unit outputs an encrypted slice partial in accordance with a rebuilding topology of the rebuilding parameters. For example, DS unit 1 sends the encrypted slice partial associated with DS unit 1 directly to DS unit 2 and DS unit 3 sends the encrypted slice partial associated with DS unit 3 to DS unit 4 (e.g., at the same site) in accordance with the rebuilding topology. DS unit 4 receives the encrypted slice partial associated with DS unit 3 and combines the encrypted slice partial associated with DS unit 3 with the encrypted slice partial associated with DS unit 4 in accordance with the rebuilding topology. For instance, DS unit 4 combines the encrypted slice partial associated with DS unit 3 with the encrypted slice partial associated with DS unit 4 utilizing a XOR function in accordance with the formula: combined encrypted slice partial=(K3-5)⊕ partial (2,3)⊕ (K1-4)⊕ partial (2,4). DS unit 4 sends the combined encrypted slice partial to DS unit 2 in accordance with the rebuilding topology.

Next, DS unit 2 receives the decode threshold number of encrypted slice partials as one or more encrypted slice partials and/or one or more combined encrypted slice partials. DS unit 2 combines the one or more encrypted slice partials and/or the one or more combined encrypted slice partials utilizing a decryption algorithm (e.g., XOR) to reproduce the encoded data slice to be rebuilt. For instance, DS unit 2 reproduces the encoded data slice to be rebuilt utilizing a decryption algorithm in accordance with a formula: rebuilt encoded data slice 2=(K1-4)⊕(K1-6)⊕ partial (2,1)⊕(K3-5)⊕ partial(2,3)⊕(K1-4)⊕partial (2,4)⊕(K3-5) ⊕partial (2,5)⊕(K1-6)⊕ partial (2,6). The decryption algorithm cancels the even number utilization of each key to produce an XOR sequence of the slice partials. The XOR of the slice partials reproduces the encoded data slice to be rebuilt. In such an alternative, information leakage is minimized as encoded data slices are not exposed and slice partials are encrypted.

FIG. 6B is a table illustrating an example of a dispersed storage (DS) unit key pair to DS unit key assignment table. The table includes a DS unit pair key field 102, and a DS unit key assignment field 104. The DS unit pair key field 102 includes a plurality of DS unit pair keys entries, wherein each key entry of the plurality of DS unit pair key entries includes two DS unit identifiers (IDs) of a corresponding DS unit pair enabled to utilize the key entry. For example, an entry including K1-3 corresponds to a DS unit pair key to be utilized only by DS units 1 and 3. For instance, key K1-3 is generated by DS units 1 and 3 utilizing a Diffie Hellman approach. A number of entries of the DS unit pair key field may be based on a security requirement, a number of DS units, a rebuilding topology, and a network topology.

The DS unit key assignment field 104 includes two or more DS unit identifier (ID) fields corresponding to two or more DS units included in a DS unit storage set providing key assignments. An entry (e.g., "X") associated with a DS unit signifies that the DS unit is assigned to utilize a corresponding DS unit pair key of a corresponding row of the table. For example, two X entries in a column corresponding to DS unit 1 signifies that DS unit 1 is to utilize keys K1-4 and key K1-6.

The key assignments may be assigned in a variety of ways based on the rebuilding topology and assignment goals, wherein such assignment goals include one or more of a security goal, a performance goal, and a processing loading goal. For example, assigned keys should not include a key that is shared between a DS unit pair when a first DS unit of the DS unit pair sends an encrypted slice partial to a second DS unit of the DS unit pair to avoid information leakage that may occur when the second DS unit combines the encrypted slice partials. As another example, each assigned key should be utilized an even number of times such that each assigned key cancels out (e.g., via an XOR function) when a requesting entity decodes encrypted slice partials to reproduce an encoded data slice to be rebuilt. A method to determine and utilize keys is discussed in greater detail with reference to FIGS. 7A-8.

Figure 7A:
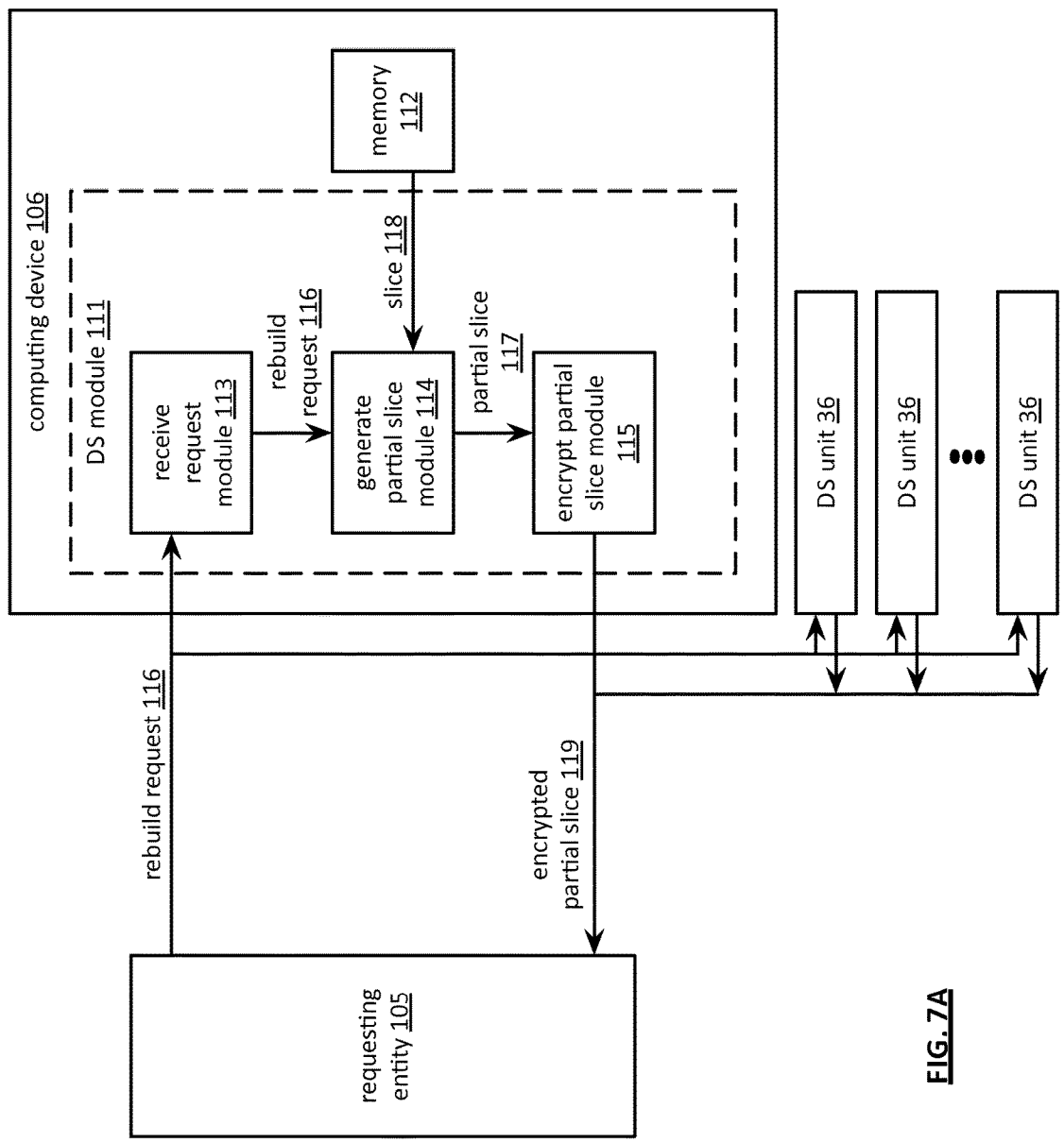
FIG. 7A is a schematic block diagram of another embodiment of a computing system in accordance with the present invention.

FIG. 7A is a schematic block diagram of another embodiment of a computing system that includes a requesting entity 105, a computing device 106, and a plurality of dispersed storage (DS) units 36. The requesting entity 105 may be implemented as at least one of a DS processing unit, a user device, another DS unit 36, a storage integrity processing unit, and a DS managing unit 18 of a distributed storage network (DSN). For example, the requesting entity 105 includes the other DS unit 36 that is rebuilding an encoded data slice. The computing device 106 may be implemented as at least one of a DS unit 36 and a user device. For example, the computing device 106 is a DS unit 36 of a decode threshold number of DS units 36 that includes at least some of the plurality of DS units 36, wherein the decode threshold number of DS units 36 assist the requesting entity 105 to rebuild the encoded data slice. The computing device 106 includes a DS module 111 and a memory 112. The memory 112 may be implemented utilizing one or more memory devices including one or more of a FLASH memory, random access memory, a magnetic disk drive, and an optical disk drive. The computing device 106 may utilize the memory 112 when the computing device is the DS unit 36 to facilitate storing of one or more encoded data slices. The DS module 111 includes a receive request module 113, a generate partial slice module 114, and a encrypt partial slice module 115.

The receive request module 113, when operable within the computing device 106, receives a rebuild request 116 regarding an encoded data slice. For example, the receive request module 113 receives the rebuild request 116 from the requesting entity 105 when the requesting entity 105 facilitates rebuilding of the encoded data slice by issuing a rebuild request regarding the encoded data slice to at least some of a set of DS units 36 of the plurality of DS units 36. The rebuild request includes one or more of rebuilding participant identifiers (IDs), Diffie Hellman parameters, a rebuilding topology, a number of keys to utilize indicator, a DS unit pair key indicator, a DS unit key assignment, a pillar index to rebuild indicator, a slice name list, a requesting entity identifier (ID), a key generation algorithm, a key generation algorithm ID, and rebuilding parameters. The rebuilding parameters includes one or more of a pillar width, a decode threshold number, a pillar index to be rebuilt, a rebuilding participant list (e.g., DS units IDs), a rebuilding topology (e.g., DS unit 1 to DS unit 2, DS unit 3 to DS unit 4 to DS unit 2, DS unit 5 to DS unit 6 to DS unit 2), an encoding matrix, a square matrix, and an inverted square matrix.

The generate partial slice module 114, when operable within the computing device, generates a partial slice 117 corresponding to the encoded data slice to be rebuilt based on an encoded data slice 118 that includes one of a set of encoded data slices stored by the computing device 106 (e.g., a DS unit 36) that includes the DS module 111. For example, the generate partial slice module 114 identifies the encoded data slice 118 based on the rebuild request 116, retrieves the encoded data slice 118 from memory 112, and generates the partial slice 117 utilizing the encoded data slice 118 based on the rebuild request 116 (e.g., based on rebuilding parameters). The generating the partial slice 117 includes one or more of obtaining an encoding matrix utilized to generate the encoded data slice (e.g., extract from the rebuild request 116, retrieve from memory 112), reducing the encoding matrix to produce a square matrix that exclusively includes rows identified in the partial rebuilding request (e.g., slice pillars associated with participating DS units of a decode threshold number of DS units), inverting the square matrix to produce an inverted matrix (e.g. alternatively, may extract the inverted matrix from the rebuild request 116), matrix multiplying the inverted matrix by the encoded data slice 118 to produce a vector, and matrix multiplying the vector by a row of the encoding matrix corresponding to the encoded data slice to be rebuilt (e.g. alternatively, may extract the row from the rebuild request 116) to produce the partial slice 117. For example, when a pillar 2 encoded data slice is to be rebuilt, a DS unit 4 generates partial slice (2,4)=(inverted square matrix of an encoding matrix utilizing participating rows 1, 3, 4, 5, 6)*(a data matrix with a pillar 4 encoded data slice in a third row)*(a second row of the encoding matrix corresponding to a pillar number of the encoded data slice to be rebuilt) when a decode threshold is 5 and a pillar width is 8.

The encrypt partial slice module 115, when operable within the computing device 106, encrypts the partial slice 117 using an encryption key of a set of encryption keys to produce an encrypted partial slice 119, wherein the encryption key is used by another DS module 111 of another DS unit 36 to produce another encrypted partial slice 119. The encrypt partial slice module 115 is further operable to generate, in conjunction with the other DS module 111, a shared secret and generate the encryption key based on the shared secret. The generating of the shared secret may include one or more of a lookup, receiving the shared secret, and utilizing a Diffie Hellman approach (e.g., each DS module 111 utilizes Diffie Hellman parameters to produce public values which are exchanged and utilized in a Diffie Hellman function to produce the shared secret).

The encryption key may be generated by masking the shared secret to produce a masked shared secret and expanding the shared secret and/or the masked shared secret. The masking includes performing a deterministic function on at least one of the shared secret and one or more key elements. The deterministic function includes at least one of a hash algorithm (e.g., message digest (MD)-5, secure hash algorithm (SHA)-1, SHA-256, SHA 512), a hash-based message authentication code (HMAC, e.g., HMAC-MD-5), and a mask generating function (MGF). A key element of the one or more key elements includes at least one of a source name, a slice revision number, a requesting entity identifier (ID), and a rebuilding participants list (e.g., of the at least some of the DS units). The expanding includes expanding the shared secret and/or the masked shared secret to a length substantially the same as the partial slice 117 utilizing at least one of the MGF, a stream cipher with hash/HMAC output (e.g., when stream ciphers uses XOR), a block cipher (e.g., advanced encryption standard AES, data encryption standard DES) using encryption mode such as or more of output feedback (OFB), cipher feedback (CFB), and counter mode (CTR) with hash/HMAC output.

The encrypt partial slice module 115 is further operable to exclusive OR the partial slice 117 with the encryption key of the set of encryption keys to produce the encrypted partial slice 119. The encrypt partial slice module 115 is further operable to assign multiple encryption keys of the set of encryption keys to the DS module 111, wherein each of the multiple encryption keys is used by another DS unit 36 of a plurality of DS units 36. For example, a first DS unit utilizes two encryption keys that includes encryption key 3 and encryption key 7, a second DS unit utilizes encryption key 3, and a third DS unit utilizes encryption key 7 such that each encryption key is utilized an even number of times.

The encrypt partial slice module 115 is further operable to encrypt a first partial slice of an array of partial slices (e.g., from the at least some of the DS units of the plurality of DS units 36) using a first encryption key of the set of encryption keys to produce a first encrypted partial slice and exclusive OR the first encrypted partial slice and a second encrypted partial slice to produce a combined encrypted partial slice, wherein another DS module encrypts a second partial slice of the array of partial slices using a second encryption key of the set of encryption keys to produce the second encrypted partial slice. For example, a second DS unit produces the second encrypted partial slice and sends the second encrypted partial slice to a first DS unit. Next, the first DS unit produces the first encrypted partial slice, exclusive ORs the first encrypted partial slice with the second encrypted partial slice to produce the combined encrypted partial slice, and outputs the combined encrypted partial slice to the requesting entity 105. The requesting entity 105 is operable to receive an array of encrypted partial slices 119 from the at least some of the plurality of DS units and exclusive OR the array of encrypted partial slices to reproduce the encoded data slice.

Figure 7B:
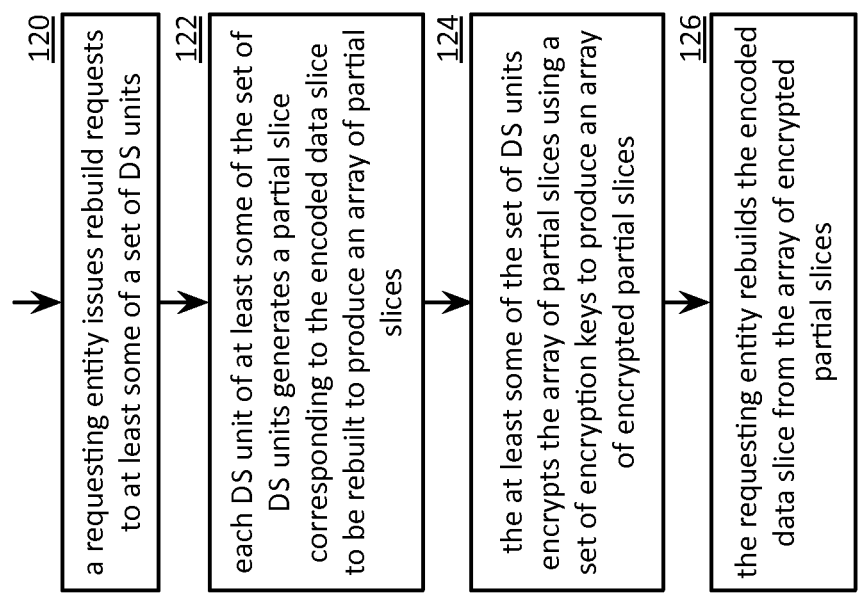
FIG. 7B is a flowchart illustrating an example of rebuilding a slice in accordance with the present invention.

FIG. 7B is a flowchart illustrating an example of rebuilding a slice. The method begins at step 120 where a processing module of a requesting entity issues a rebuild request regarding an encoded data slice to at least some of a set of distributed storage (DS) units. The requesting entity includes a DS unit of the set of DS units, wherein the DS unit is to store the encoded data slice to be rebuilt. In response to the rebuild request, the method continues at step 122 where a processing module of each of at least some of the DS units of the set of DS units generates a partial slice corresponding to the encoded data slice to be rebuilt based on one of a set of encoded data slices stored by the respective DS unit to produce an array of partial slices.

The method continues at step 124 where a processing module of a DS unit encrypts the array of partial slices using a set of encryption keys, wherein each encryption key of the set of encryption keys is used 2*n times to produce an array of encrypted partial slices, where n is an integer greater than or equal to 1. There is a variety of ways to do the encrypting. For example, the encrypting includes arranging, when n equals 1, at least some of DS units into DS unit pairings, wherein each DS unit of a DS unit pairing uses a same encryption key of the set of encryption keys. As another example, the encrypting includes, a DS unit pairing generating a shared secret and generating the same encryption key based on the shared secret. As yet another example, the encrypting includes, when n equals 1 and the DS units includes an odd number of DS units, pairing one of the DS units with two other DS units to use a first encryption key of the set of encryption keys and arranging remaining DS units into DS unit pairings. As a further example, the encrypting includes a DS unit exclusive ORing a partial slice of the array of partial slices with an encryption key to produce an encrypted partial slice.

As an even further example, the encrypting includes assigning multiple encryption keys of the set of encryption keys to a DS unit and assigning each of the multiple encryption keys to at least one other DS unit. As a still further example, the encrypting includes encrypting, by a DS unit, a first partial slice using a first encryption to produce a first encrypted partial slice, encrypting, by another DS unit, a second partial slice using a second encryption key to produce a second encrypted partial slice, and exclusive ORing, by one or the other DS unit, the first encrypted partial slice and the second encrypted partial slice to produce a combined encrypted partial slice.

The method continues at step 126 where the processing module of the requesting entity rebuilds the encoded data slice from the array of encrypted partial slices. The rebuilding includes exclusive ORing the array of encryption partial slices to produce the encoded data slice. The rebuilding further includes decrypting the array of encrypted partial slices based on the set of encryption keys to produce the array of partial slices and decoding the array of partial slices to rebuild the encode data slice.

Figure 8:
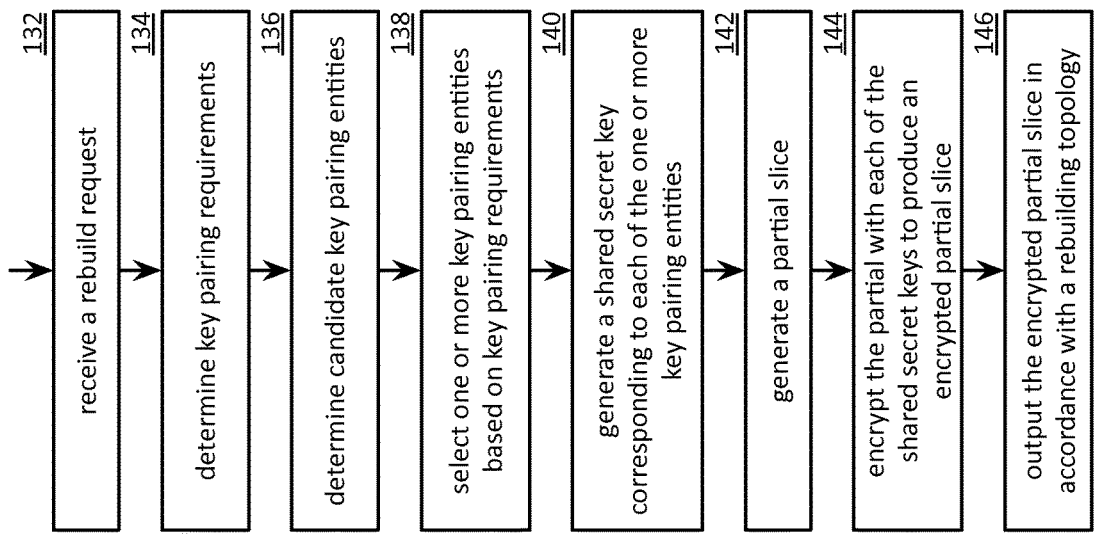
FIG. 8 is a flowchart illustrating another example of generating an encrypted partial slice in accordance with the present invention.

FIG. 8 is a flowchart illustrating another example of generating an encrypted partial slice. The method begins at step 132 where a processing module (e.g., of a dispersed storage (DS) unit) receives a rebuild request from a requesting entity (e.g., another DS unit). The method continues at step 134 where the processing module determines key pairing requirements. The key pairing requirements includes one or more of a performance requirement, a security requirement, and a processor loading requirement. The determination may be based on one or more of the rebuild request, a predetermination, a message, a dispersed storage network (DSN) performance indicator, a DSN security indicator, a vault identifier (ID), and a requester ID. For example, the processing module determines a lower than average processor loading requirement when the DSN performance indicator indicates that the DSN system is loaded more than average. As another example, the processing module determines a higher than average security requirement when the DSN security indicator indicates that higher security is required.

The method continues at step 136 where the processing module determines candidate key pairing entities. The determination may be based on one or more of the key pairing requirements, a rebuilding topology, a security requirement, rebuilding participants, and a bandwidth utilization requirement. For example, the processing module may determine a lower than average number of candidate key pairing entities when the key pairing requirements includes a lower than average processor loading requirement. As another example, the processing module may determine a higher than average number of candidate key pairing entities when the key pairing requirements includes a higher than average security requirement.

The method continues at step 138 where the processing module selects one or more key pairing entities of the candidate key pairing entities based on the key pairing requirements. The selection may be based on one or more of optimizing a match of the key pairing requirements to an estimated performance an estimated security associated with a desired number of candidate key pairing entities. For example, the processing module selects a lower than average number of key pairing entities for better performance and selects a higher than average number of key pairing entities for better security. As another example, the processing module selects a key pairing entity for utilization of an associated key and even number of times amongst all dispersed storage (DS) units. For instance, the processing module selects a node ahead and a node behind a reference DS unit (e.g., associated with the processing module), wherein the node ahead, the DS unit, and the node behind are substantially sequenced in order in accordance with a rebuilding topology. In another instance, the processing module selects two nodes ahead and two nodes behind.

The method continues at step 140 where the processing module generates a shared secret key corresponding to each of the one or more key pairing entities. The method continues at step 142 where the processing module generates a partial slice. The method continues at step 144 where the processing module encrypts the partial slice with each of the shared secret keys to produce an encrypted partial slice (e.g., exclusive OR of each key and the partial slice). The method continues at step 146 where the processing module outputs the encrypted partial slice in accordance with a rebuilding topology. For example, the processing module sends the encrypted partial slice directly to the requesting entity when the rebuilding topology indicates that the requesting entity is located with the processing module. As another example, the processing module sends the encrypted partial slice to the requesting entity via another DS unit, wherein the other DS unit produces a corresponding encrypted partial slice, combines the encrypted partial slice and the corresponding encrypted partial slice to produce a combined encrypted partial slice (e.g., exclusive OR), and sends the combined encrypted partial slice to the requesting entity.

Figure 9A:
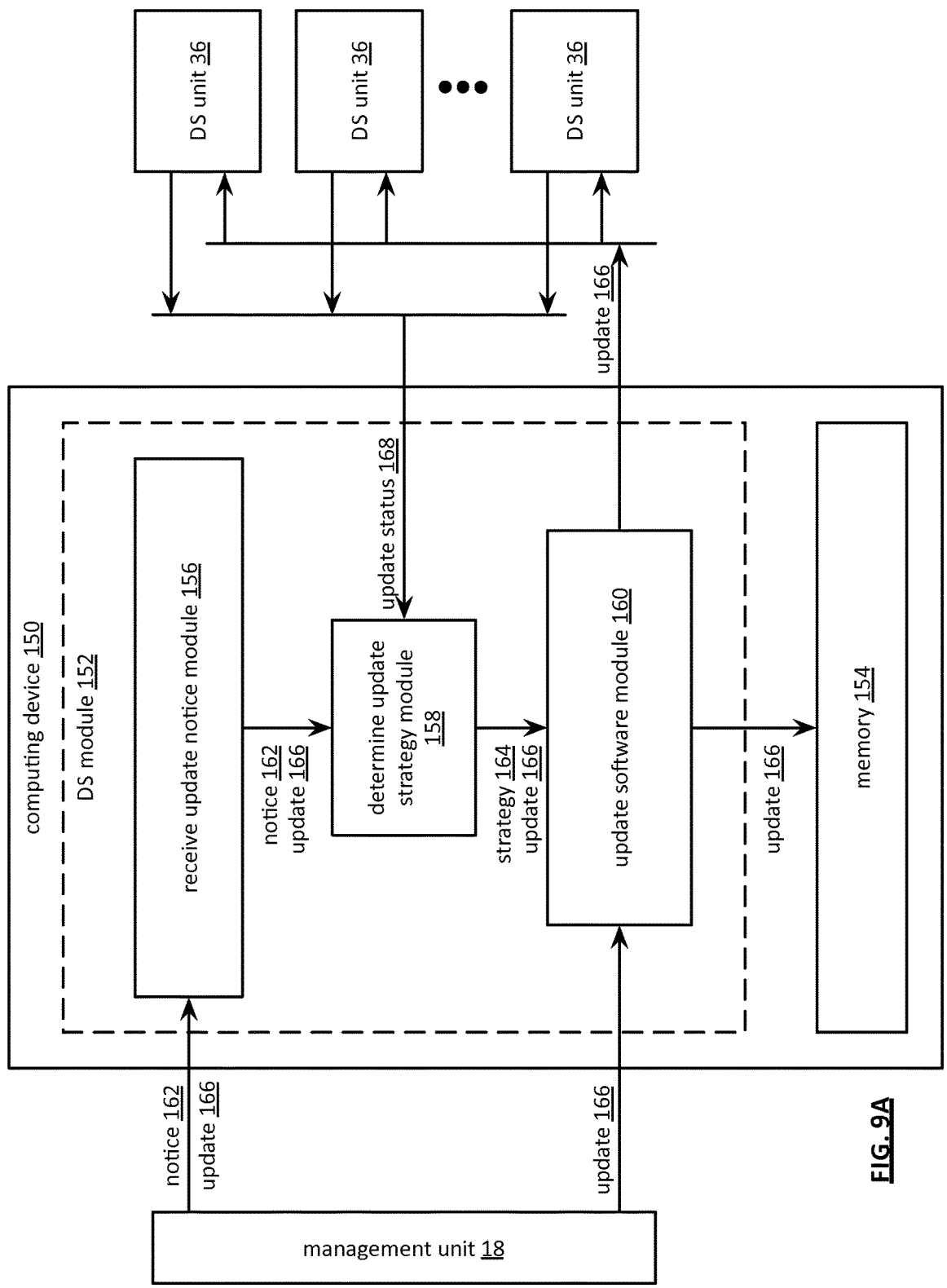
FIG. 9A is a schematic block diagram of another embodiment of a computing system in accordance with the present invention.

FIG. 9A is a schematic block diagram of another embodiment of a computing system that includes a management unit 18, a computing device 150, and a plurality of dispersed storage (DS) units 36, which supports a plurality of digital storage vaults. A set of the DS units 36 supports one or more of the plurality of digital storage vaults, where a DS unit (e.g., the computing device 150) of the set stores encoded data slices (e.g., in memory 154) associated with the digital storage vault.

The computing device 150 may be implemented as at least one of a DS processing unit, a user device, and a DS unit 36. For example, the computing device 150 is implemented as a DS unit 36 of a set of DS units 36 of the plurality of DS units 36. The computing device 150 includes a DS module 152 and a memory 154. The memory of 154 may be implemented utilizing one or more memory devices including one or more of a FLASH memory, random access memory, a magnetic disk drive, and an optical disk drive. The memory 154 may be utilized by the computing device 152 to store software associated with the computing device 150. The software includes one or more of operating system software, bootstrap firmware, application software, and software configuration information. The DS module 152 includes a receive update notice module 156, a determine update strategy module 158, and an update software module 160.

The receive update notice module 156, when operable within the computing device 150, causes the computing device 150 to receive a software update notice 162 (e.g., from the management unit 18). The software update notice 162 includes at least one of a software update indicator and a software update 166. The software update indicator includes at least one of a software revision number and a software update retrieval location.

The determine update strategy module 158, when operable within the computing device 150, determines, in regards to the software update notice 162, an update strategy 164 for updating software of the DS unit (e.g., the computing device 150) such that at least a decode threshold number of DS units 36 of the set of DS units 36 is continually available to service access requests to the digital storage vault. The update strategy 164 includes at least one of never updating, updating now, and updating later. The update strategy may be determined in a variety of ways. For example, the determine update strategy module 158 determines the status of the software update 166 that is used to update the software and determines the update strategy 164 based on the status of the software update. The status of the software update includes at least one of a time indicator, a mandatory critical status, a mandatory noncritical status, and an optional status. As a specific example, the determine update strategy module 158 determines the update strategy 164 to include updating now when the software update 166 includes the mandatory critical status. As another specific example, the determine update strategy module 158 determines the update strategy 164 to include updating later when the software update 166 includes the mandatory noncritical status.

As another example, the determine update strategy module 158 determines the update status 168 of DS units 36 in the set and determines the update strategy 164 based on their update status 168. The update status 168 includes at least one of available, unavailable, already updated, and not already updated. As a specific example, the determine update strategy module 158 determines the update strategy 164 to include updating later when the update status 168 indicates that only a decode threshold number of DS units 36 (e.g., including the computing device 150) of the set of DS units 36 is available.

As yet another example, the determine update strategy module 158 identifies a set of digital storage vaults supported by the DS unit (e.g., the computing device 150). The strategy module 158 then identifies other DS units that are also supporting the set of digital storage vaults. The strategy module then determines the update strategy 164 such that at least a decode threshold number of DS units 36 for each vault is continually available. For example, the determine update strategy module 158 determines the update strategy 164 to include updating later when the update status 168 of one set of the set of sets of DS units indicates that only a decode threshold number of DS units 36 of the set of DS units 36 is available.

As a further example, the determine update strategy module 158 determines priority status of at least some of the vaults and determining the update strategy based on the priority status of the vaults. The priority status includes at least one of high priority, general priority, low priority, and no priority. For example, the update strategy module 158 determines the update strategy 164 to include updating DS units 36 associated a first vault immediately and updating DS units 36 associated with a second vault later when the first vault is associated with a priority status of a greater priority than a priority status of the second vault.

The update software module 160, when operable within the computing device 150, updates the software of the DS unit (e.g., the computing device 150) in accordance with the update strategy 164. For example, the updating the software may be done by facilitating storage of the software update 166 in the memory 154, facilitating replacing an older revision of software with the software update 166, configuring DS unit software in accordance with configuration information of the software update 166, activating the software update 166, deleting the older revision of software, and/or deleting the older revision of software when the software update 166 is operational.

Figure 9B:
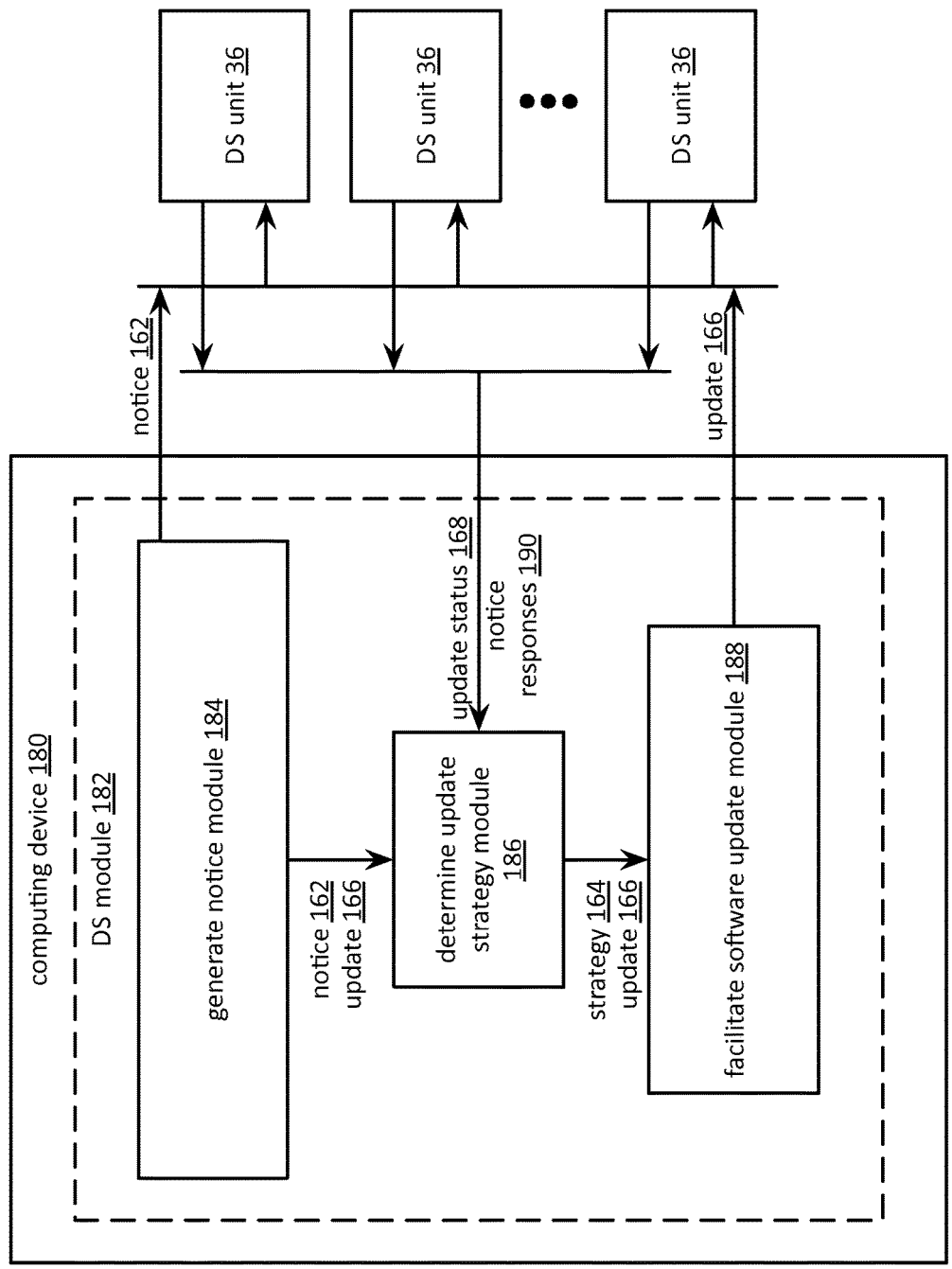
FIG. 9B is a schematic block diagram of another embodiment of a computing system in accordance with the present invention.

FIG. 9B is a schematic block diagram of another embodiment of a computing system that includes a computing device 180 and a plurality of dispersed storage (DS) units 36. The computing device 180 may be implemented as at least one of a DS processing unit, a user device, DS unit 36, and a DS managing unit 18 of a distributed storage network (DSN). The computing device 180 includes a DS module 182. The DS module 182 includes a generate notice module 184, a determine update strategy module 186, and a facilitate software update module 188.

The generate notice module 184, when operable within a computing device 180, generates and sends a software update notice 162 to the dispersed storage (DS) units 36. The DS units 36 support digital storage vaults, where a set of the DS units 36 supports one of the digital storage vaults. The software update notice 162 includes a software update indicator and/or a software update 166. The software update indicator includes a software revision number and/or a software update retrieval location.

The determine update strategy module 186, when operable within the computing device 180, determines, in regards to the software update notice 162, an update strategy 164 for updating software of the DS units 36 such that at least a decode threshold number of DS units 36 is continually available to service access requests to the digital storage vaults. The update strategy may be determined in a variety of ways. For example, the determine update strategy module 186 receives responses 190 (e.g., a software revision indicator, an available indicator, and an unavailable indicator) from the DS units regarding the software update notice 162. The strategy module 186 then identifies a DS unit 36 in accordance with the update strategy 164 and facilitates (e.g., send the software update) updating the software of the identified DS unit. As a specific example, the determine update strategy module sends the software update 166 to the identified DS unit when the response 190 of the identified DS unit indicates that it has an older software version and that it is available for updating. The strategy module may also determine the update strategy in a similar manner to the strategy module of FIG. 9A.

The facilitate software update module 188, when operable within the computing device 180, facilitates updating the software of a DS unit 36 in accordance with the update strategy 164. For example, the facilitate software update module 188 obtains (e.g., receive, request, generate, etc.) the software update 166 and outputs it to one or more of DS units 36 in accordance with the update strategy 164.

Figure 9C:
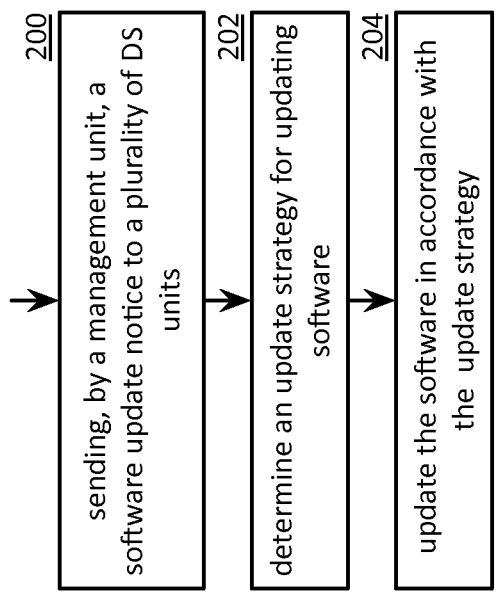
FIG. 9C is a flowchart illustrating an example of updating software in accordance with the present invention.

FIG. 9C is a flowchart illustrating an example of updating software. The method begins at step 200 where a management unit of a distributed storage network (DSN) sends a software update notice to dispersed storage (DS) units that support digital storage vaults. The software update notice includes a software update and/or a software update indicator, which includes a software revision number and/or a software update retrieval location.

The method continues at step 202 where a processing module (e.g. of a DS management unit, of a DS unit) determines, in regards to the software update notice, an update strategy for updating software of the DS units such that at least a decode threshold number of DS units is continually available to service access requests to the digital storage vaults. Examples of determining the update strategy have been previously discussed. The method continues at step 204 where the processing module updates the software of at least some of the DS units in accordance with the update strategy.

FIG. 10A is a flowchart illustrating an example of encrypting an encoded data slice. The method begins at step 210 where a processing module (e.g., of a dispersed storage (DS) processing unit) dispersed storage error encodes a data segment to produce a set of encoded data slices for storage in a dispersed storage network (DSN) memory. The method continues at step 212 where the processing module obtains a secret key (e.g., retrieving it, generating it from a random key, generating it based on a deterministic function (e.g., a hash function)).

The method continues at step 214 where the processing module encrypts an encoded data slice of the set of encoded data slices utilizing the secret key. The method continues at step 216 where the processing module encrypts the secret key utilizing a public key. The processing module then obtains the public key from a public/private key pair associated with a target entity (e.g., a receiving DS unit).

The method continues at step 218 where the processing module creates a package that includes the encrypted data slice, the encrypted secret key, a timestamp, a sequence number, and/or an opcode (e.g., write, checked write, delete). The method continues at step 220 where the processing module creates a signed package (e.g., signs the package using a secure digital signature). For example, the processing module encrypts a hash digest of the package utilizing a private key associated with the processing module (e.g., the sender) to produce the signature.

The method continues at step 222 where the processing module sends the signed package to a DS unit to facilitate storage of the encrypted data slice and the encrypted secret key. The method continues at step 224 where the processing module sends a certificate chain to the DS unit. For example, the processing module sends the certificate chain once per batch of sending a plurality of signed packages to the DS unit. As another example, the processing module sends the certificate chain to the DS unit with each signed package.

FIG. 10B is a flowchart illustrating an example of decrypting an encrypted data slice. The method begins at step 226 where a processing module (e.g., of a dispersed storage (DS) unit) receives a signed package and may further receive a certificate chain. The method continues at step 228 where the processing module validates a signature of the signed package. For example, the processing module decrypts the signature utilizing a public-key associated with a sender of the signed package and then compares the decrypted signature to a calculated hash digest of the package. If the comparison is favorable (e.g., the decrypted signature is substantially the same as the calculated hash digest), the signature is validated. Alternatively, or in addition to, the processing module validates the certificate chain when a certificate chain is received.

The method continues at step 230 where the processing module validates permissions associated with the signed package. For example, the processing module compares a requester identity (ID) and an opcode to a list of allowed operations associated with the requester ID. When the signature and permissions are valid, the method continues at step 232 where the processing module decrypts an encrypted secret key utilizing a private key to recapture the secret key. Note that the private key may be associated with a public/private key pair of the processing module (e.g., for a current DS unit).

The method continues at step 234 where the processing module decrypts an encrypted data slice utilizing the secret key to recapture the encoded data slice. The method continues at step 236 where the processing module validates the package. For example, the processing module verifies that a sequence number of the package compares favorably (e.g., greater than) to a previous sequence number. As another example, processing module verifies that a timestamp of the package compares favorably (e.g., less than) to at least one of a previous timestamp and a current timestamp. The method continues at step 238 where the processing module performs an operation (e.g., write, checked write, delete) in accordance with an opcode of the package when the package is validated.

FIG. 11A is a flowchart illustrating an example of storing a data segment, which includes similar steps to FIG. 10A. The method begins at step 240 where a processing module (e.g., a dispersed storage (DS) processing unit) generates integrity information for a data segment to be stored in a dispersed storage network (DSN) memory. For example, the integrity information may be a hash digest (e.g., a hash function on the data segment), a checksum of the data segment, and/or a signature of the data segment (e.g., encrypting a hash of the data segment utilizing a private key of a public/private key pair associated with the processing module).

The method continues at step 242 where the processing module combines (e.g., appending, interlacing, and/or encoding the integrity information and data segment) integrity information and the data segment to produce a data package. The method continues at step 212 of FIG. 10A where the processing module obtains a secret key and thereafter continues at step 246 where the processing module encrypts the data package utilizing the secret key to produce an encrypted data package.

The method continues at step 248 where the processing module dispersed storage error encodes the encrypted data package utilizing a systematic erasure code of dispersed storage error coding parameters to produce a set of encoded encrypted slices. The systematic erasure code includes matrix multiplying a data matrix of the encrypted data package with an encoding matrix that includes a unity matrix portion to produce a matrix of encoded codes. The encoded codes are combined to produce the set of encoded encrypted slices. The encoded codes that result from the matrix multiplication of the elements of the data matrix with the unity matrix portion of the encoding matrix are substantially similar to the corresponding elements of the data matrix.

The method continues at step 250 where the processing module encodes the secret key utilizing a secret sharing algorithm (e.g., Shamir secret sharing method and/or dispersed storage error encoding) to produce a set of secret shares. Note that if the encoding includes the dispersed storage error encoding, the encoding may utilize a different pillar width and/or a different decode threshold number than the dispersed storage error encoding of the encrypted data package.

The method continues at step 252 where the processing module sends the set of encoded encrypted slices to the DSN memory for storage therein. The method continues at step 254 where the processing module sends the set of secret shares to the DSN memory for storage therein. For example, processing module sends the set of secret shares to a different portion (e.g., different DS unit) of the DSN memory as compared to where it sent the set of encoded encrypted slices.

FIG. 11B is a flowchart illustrating an example of retrieving a data segment. The method begins at step 256 where a processing module (e.g., of a dispersed storage (DS) processing unit) retrieves a decode threshold number of encoded encrypted slices of a set of encoded encrypted slices from a dispersed storage network (DSN) memory. The method continues at step 258 where the processing module retrieves a decode threshold number of secret shares of a set of secret shares from the DSN memory.

The method continues at step 260 where the processing module decodes the decode threshold number of secret shares utilizing a secret sharing algorithm to reproduce a secret key. The method continues at step 262 where the processing module dispersed storage error decodes the decode threshold number of encoded encrypted slices to reproduce an encrypted data package. The method continues at step 264 where the processing module decrypts the encrypted data package utilizing the secret key to reproduce a data segment and recovered integrity information. For example, the processing module separates the decrypted data package into the data segment and the recovered integrity information.

The method continues at step 266 where the processing module validates the recovered integrity information. For example, the processing module generates integrity information for the data segment and compares it to the recovered integrity information. If the comparison is favorable (e.g., substantially the same), then the integrity information is validated. In addition, the processing module may output the data segment to a requesting entity when the recovered integrity information is favorably validated.

Figure 12A:
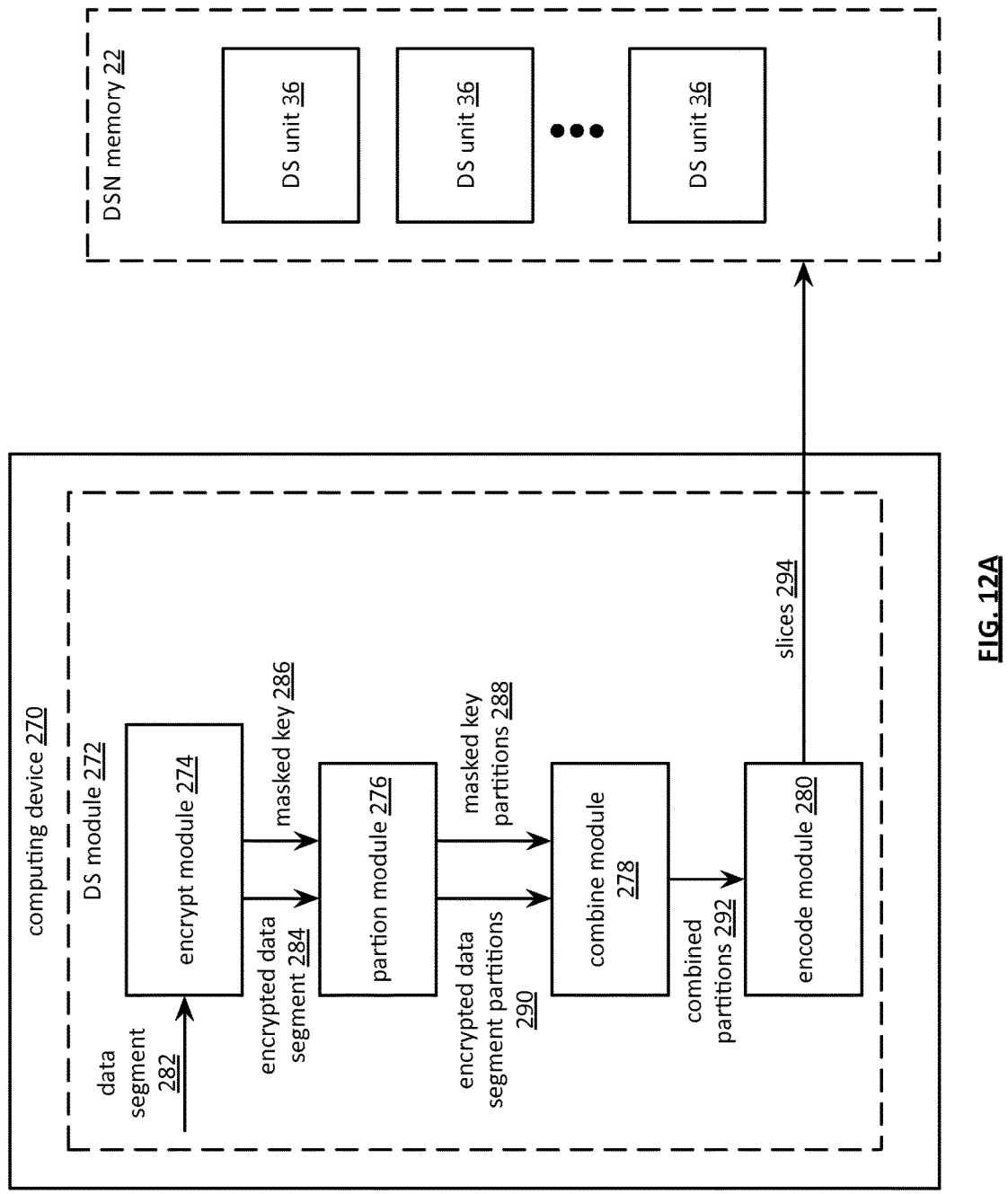
FIG. 12A is a schematic block diagram of another embodiment of a computing system in accordance with the present invention.

FIG. 12A is a schematic block diagram of another embodiment of a computing system that includes a computing device 270 and a distributed storage network (DSN) memory 22. The distributed storage network memory 22 includes a plurality of dispersed storage (DS) units 36. The computing device 270 includes a DS module 272 and may be implemented as a DS processing unit, a user device, another DS unit 36, a storage integrity processing unit, and/or a DS managing unit 18 of a DSN. The computing device The DS module 272 includes an encrypt module 274, a partition module 276, a combine module 278, and an encode module 280.

The encrypt module 274, when operable within the computing device 270, encrypts a data segment 282 utilizing an encryption key to produce an encrypted data segment 284. In addition, the encrypt module 274 performs a deterministic function (e.g., a hashing function; a hash based message authentication code function; and/or a mask generating function) on the encrypted data segment 284 to produce a transformed representation of the encrypted data segment. The encrypt module 274 also masks the encryption key utilizing the transformed representation of the encrypted data segment to produce a masked key 286. For example, the encrypt module masks the encryption key by exclusive ORing the transformed representation and the encryption key, subtracting one from the other, adding them together, adding and/or subtracting a constant to each and then XOR, add, or subtract.

The encrypt module 274 may perform the deterministic function as a combination of deterministic functions. For example, the encrypt module 274 performs the hashing function on the encrypted data segment 284 to produce an interim value and performs the mask generating function on the interim value to produce the transformed representation of the encrypted data segment. As another example, the encrypt module 274 performs the hash based message authentication code function on the encrypted data segment 284 to produce the interim value and performs the MGF on the interim value to produce the transformed representation of the encrypted data segment.

The partition module 276, when operable within the computing device 270, partitions the masked key 286 into masked key partitions 288 and partitions the encrypted data segment 284 into encrypted data segment partitions 290. The portioning may be done in accordance with a partitioning scheme. In this instance, the partition module 276 determines the partitioning scheme based on a desired level of security, security requirements, available memory for storage, an error message, size of the data segment, size of the masked key, and/or size of the encrypted data segment. Note that the determined partitioning scheme may be to partition the masked key and/or the encrypted data segment into equal sized partitions, into variable sized partitions, and/or into adaptive sized partition.

The combine module 278, when operable within the computing device 270, combines the masked key partitions 288 with the encrypted data segment partitions 290 to produce combined partitions 292. The combining may be done in a variety of ways. For example, the combine module 278 establishing a pseudo random combining process to combine the masked key partitions 288 and the encrypted data segment partitions 290. As another example, the combine module 278 utilizes an interleaving process to combine the masked key partitions 288 with the f encrypted data segment partitions 290.

The encode module 280, when operable within the computing device 270 encodes a combined partition using a dispersed storage error coding function to produce a set of encoded data slices 294. Alternatively, the encode module 280 may encode the combined partition by encrypting it using a second encryption key. The encode module 280 then performs a deterministic function on the encrypted combined partition to produce a representation of it. The encoding module then masks the second encryption key utilizing the transformed representation and appends the second masked key to the encrypted combined partition to produce a further combined partition. The encode module then encodes the further combined partition using the same or a different dispersed storage error coding function to produce the set of encoded data slices 294.

The encode module 280 outputs the set of encoded data slices 294 for storage in at least one DS unit 36 of a DSN memory 22. For example, the encode module generates a set of slice names corresponding to the set of encoded data slices 294 and generates a set of write requests for the encoded data slices 294. The encode module then selects a set of storage resources (e.g., a set of DS units, DSN memory 22, a second DSN memory, and/or an adjunct memory) and outputs the write requests to the storage resources. The encode module may select the storage resources based on a storage scheme, a DSN memory availability indicator, a storage location indicator, a user input, and/or an available adjunct memory indicator.

Figure 12B:
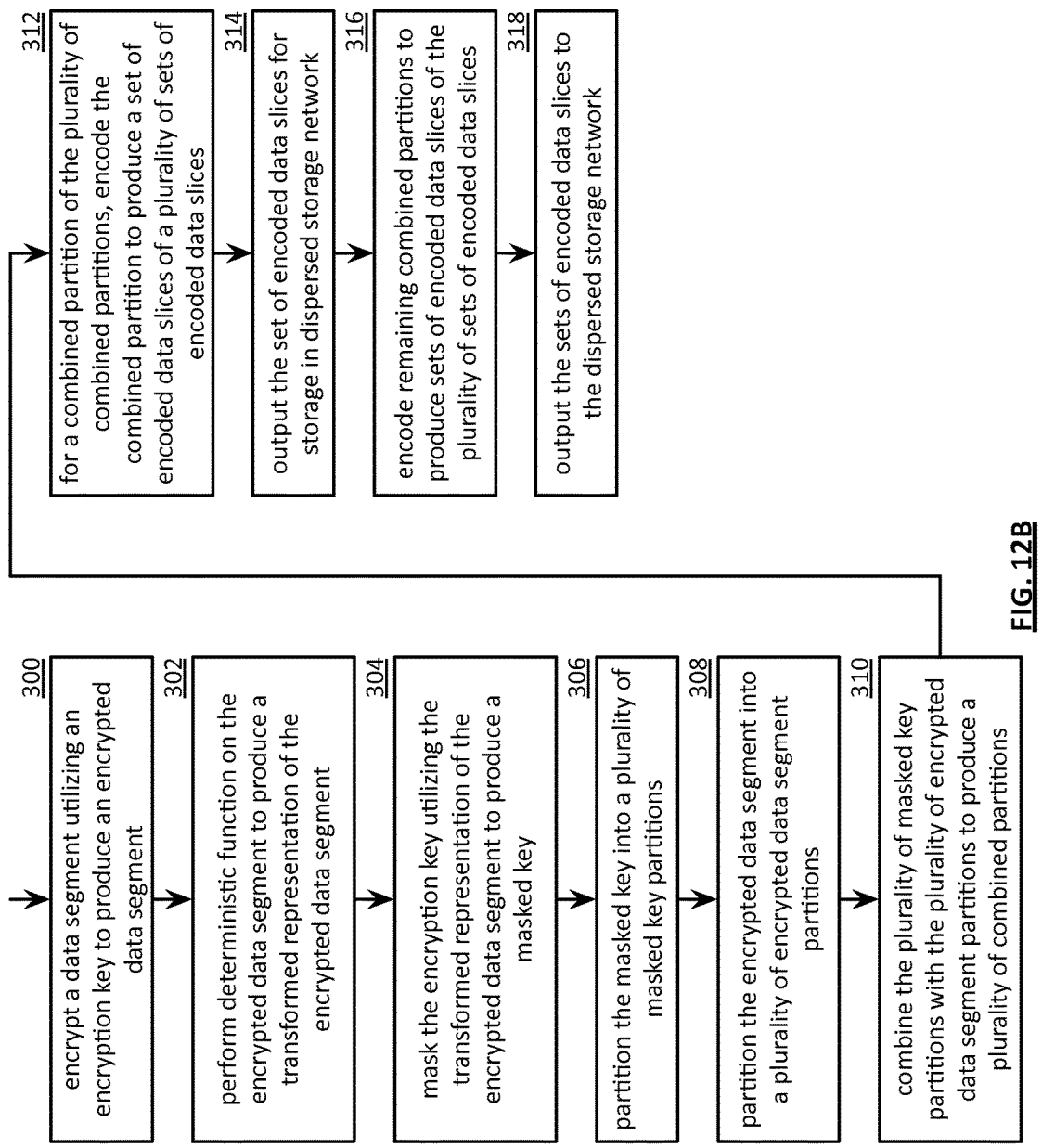
FIG. 12B is a flowchart illustrating an example of securing a data segment in accordance with the present invention.

FIG. 12B is a flowchart illustrating an example of securing a data segment. The method begins at step 300 where a processing module (e.g., of a dispersed storage (DS) processing unit of a dispersed storage network (DSN)) encrypts the data segment utilizing an encryption key. The method continues at step 302 where the processing module performs a deterministic function on the encrypted data segment to produce a transformed representation of the encrypted data segment. The method continues at step 304 where the processing module masks the encryption key utilizing the transformed representation of the encrypted data segment to produce a masked key.

The method continues at step 306 where the processing module partitions the masked key into masked key partitions. The method continues at step 308 where the processing module partitions the encrypted data segment into encrypted data segment partitions. The method continues at step 310 were the processing module combines the plurality of masked key partitions with the plurality of encrypted data segment partitions to produce a plurality of combined partitions.

The method continues at step 312 where the processing module encodes a combined partition using a dispersed storage error coding function to produce a set of encoded data slices. The method continues at step 314 where the processing module outputs the set of encoded data slices for storage in a DS unit of the DSN. The method continues at step 316 where the processing module encodes remaining combined partitions using the dispersed storage error coding function to produce sets of encoded data slices.

The method continues at step 318 where the processing module outputs the sets of encoded data slices for storage in DS units of the DSN. For example, the processing module outputs the encoded data slices such that a first DS unit stores a first set of the sets of encoded data slices. As another example, the processing module outputs the encoded data slices such that a DS unit stores a first encoded data slice of the sets of encoded data slices.

Figure 13B:
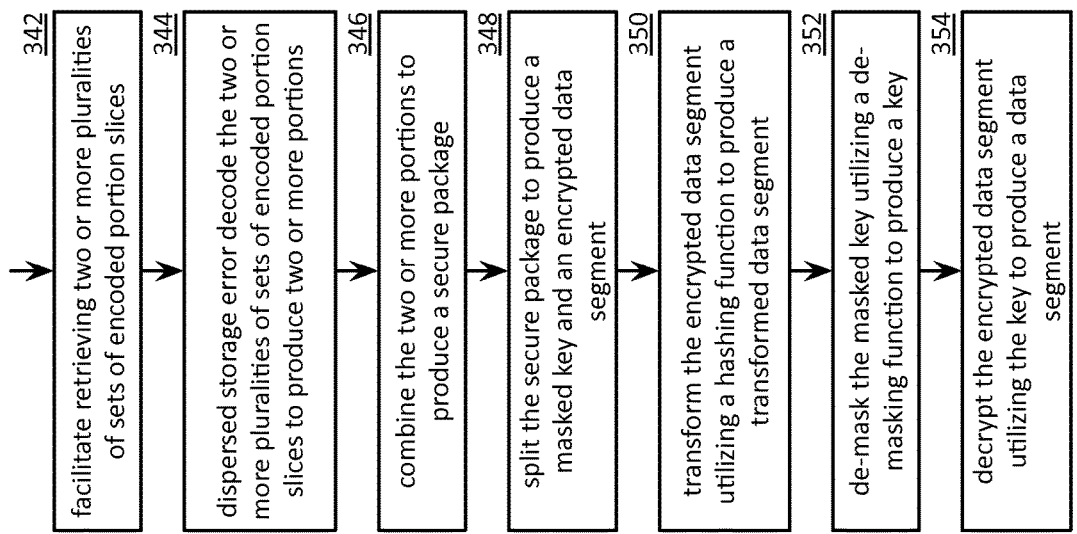
FIG. 13B is a flowchart illustrating another example of retrieving a data segment in accordance with the present invention.
Figure 13A:
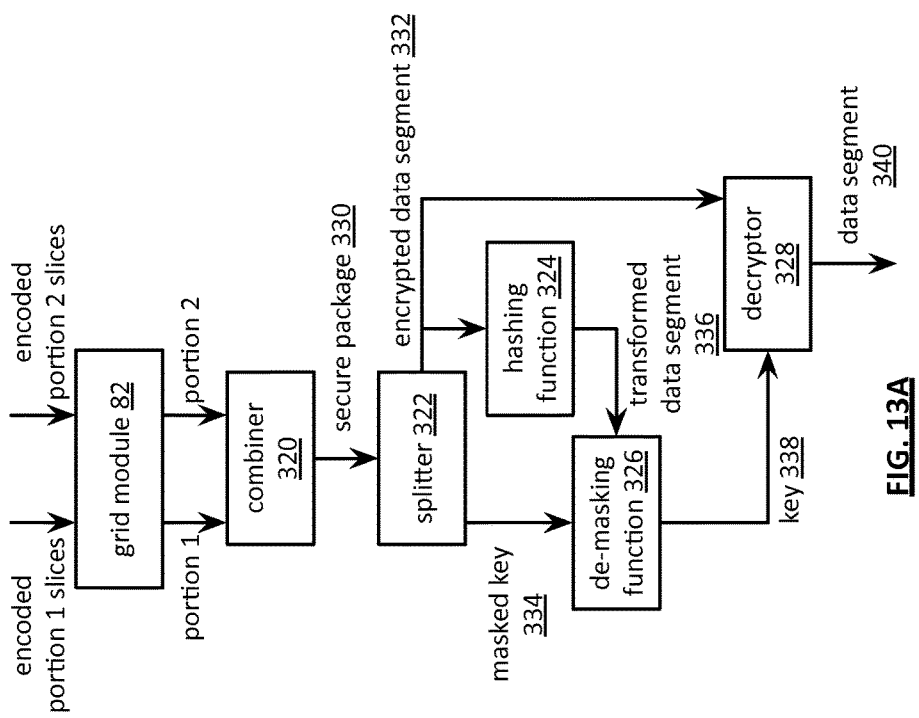
FIG. 13A is a schematic block diagram of another embodiment of dispersed storage processing module in accordance with the present invention.

FIG. 13A is a schematic block diagram of another embodiment of dispersed storage (DS) processing module that transforms at least two encoded portions of slices (e.g. encoded portion 1 slices, encoded portion 2 slices) into a data segment 340. The DS processing module includes a grid module 82, a combiner 320, a splitter 322, a hashing function 324, a de-masking function 326, and a decryptor 328. The grid module 82 receives the at least two encoded portions of slices (e.g., retrieved from a dispersed storage network (DSN) memory) and dispersed storage error decodes them to produce at least two portions of a secure package 330. For example, the grid module 82 dispersed storage error decodes encoded portion 1 slices to produce a portion 1 of the secure package and dispersed storage error decodes encoded portion 2 slices to produce a portion 2 of the secure package. The combiner 320 combines the portions to produce the secure package 330.

The splitter 322 functions to split (e.g., de-appending, de-interleaving, and decoding) a masked key 334 and an encrypted data segment 332 from the secure package 330. For example, the splitter de-appends the masked key 334 and the encrypted data segment 332 from the secure package 330 in accordance with an appending parameter.

The hashing function 324 generates a transformed data segment 336 from the encrypted data segment 332 utilizing a deterministic function. The de-masking function 326 generates a key 338 from the masked key 334 and the transformed data segment 336. For example, the de-masking function 326 exclusive ORs (XOR) the masked key 334 and the transformed data segment 336 to generate the key. As another example, the de-masking function 326 XORs the transformed data segment 336 and the masked key 334 to produce a modified key. The de-masking function 326 then modifies (e.g., add or subtract an offset, encrypting, XOR with a secret key, appending a secret key) the modified key to produce the key 338. The decryptor 328 decrypts the encrypted data segment 332 utilizing the key 338 to produce the data segment 340.

In an example of operation, the grid module 82 retrieves at least a decode threshold number of slices of a set of encoded portion 1 slices and at least a decode threshold number of slices a set of encoded portion 2 slices. Grid module 82 dispersed storage error decodes them to produce first and second portions. The combiner 320 combines the portions to produce the secure package 330 by appending the portion 2 to the portion 1.

The splitter 322 extracts the masked key 334 and the encrypted data segment 332 from the secure package 330 by de-appending the masked key 334 from the secure package 330. The hashing function 324 calculates a message digest (MD)-5 hash of the encrypted data segment 332 to generate transformed data segment 336. The de-masking function 326 calculates a XOR of the masked key 334 and the transformed data segment 336 to generate the key 338. The decryptor 328 decrypts the encrypted data segment 332 utilizing the key 338 to produce the data segment 340. The data segment 340 may subsequently be aggregated with other data segments to produce a data object as part of a retrieval sequence.

FIG. 13B is a flowchart illustrating another example of retrieving a data segment. The method begins with step 342 where a processing module (e.g., of a dispersed storage (DS) processing unit) facilitates retrieving two or more sets of encoded portion slices. The method continues at step 344 where the processing module dispersed storage error decodes the two or more sets of encoded portion slices to produce two or more portions.

The method continues at step 346 where the processing module combines the portions to produce a secure package in accordance with a combining algorithm and/or combining parameters. The method continues at step 348 where the processing module splits the secure package to extract a masked key and an encrypted data segment. The method continues at step 350 where the processing module transforms the encrypted data segment utilizing a deterministic function (e.g., a hashing function) to produce a transformed data segment. The method continues at step 352 where the processing de-masks the masked key utilizing a de-masking function to produce a key. The method continues at step 354 where the processing module decrypts the encrypted data segment utilizing the key to produce a data segment.

Figure 14:
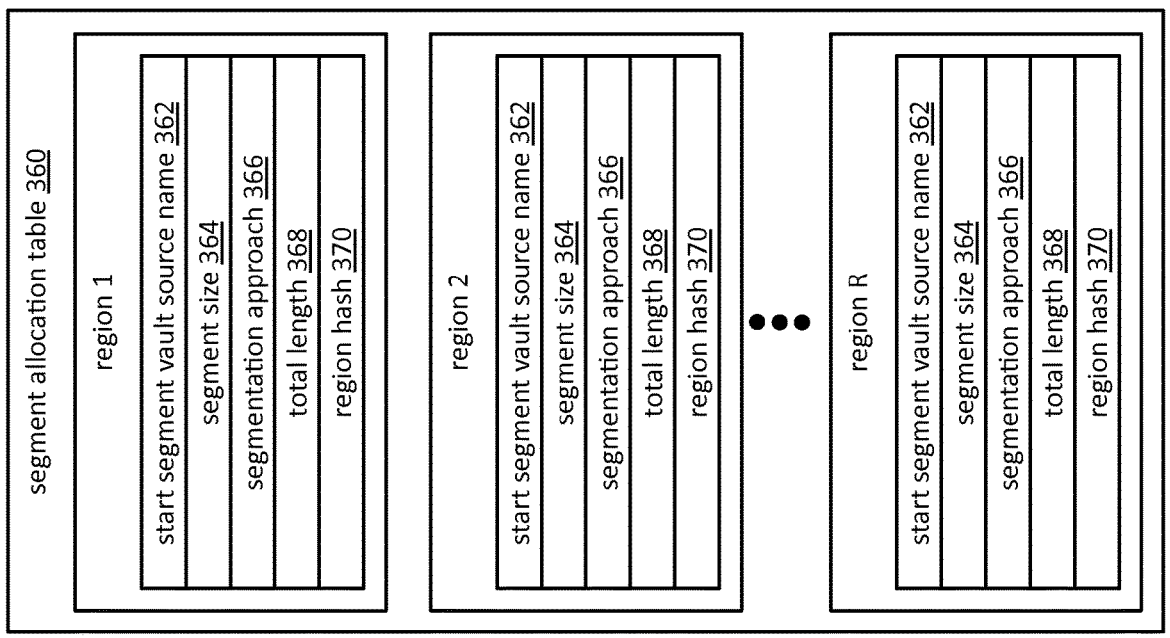
FIG. 14 is a diagram illustrating an example of a segmentation allocation table (SAT) in accordance with the present invention.

FIG. 14 is a diagram illustrating an example of a segmentation allocation table (SAT) 360 that includes a plurality of regions 1-R. Each region of the plurality of regions 1-R includes a start segment vault source name field 362, a segment size field 364, a segmentation approach field 366, a total length field 368, and a region hash field 370. The start segment vault source name field 362 includes a vault source name corresponding to a first data segment of a contiguous number of data segments that store data corresponding to a region. Alternatively, or in addition to, the start segment vault source name field may include a file identifier (ID), a segment ID, a block ID and a file type indicator (e.g., block storage or file storage). The segment size field 364 includes a segment size entry indicating a number of bytes of each segment associated with the region.

The segmentation approach field 366 includes a segmentation approach indicator, which indicates what type of segmentation is utilized when segmenting data to produce the contiguous number of data segments associated with the region. For example, segment sizes of the contiguous number of data segments are substantially the same when the segmentation approach indicator indicates a flat or fixed approach. As another example, segment sizes of the contiguous number of data segments start small and ramp up when the segmentation approach indicator indicates a ramp up approach. As yet another example, segment sizes of the contiguous number of data segments start higher and ramp down when the segmentation approach indicator indicates a ramp down approach. In such ramping approaches, the segmentation approach field 366 may also include a starting segment size, a size increment number (e.g., the difference in size between segments), and a ramp up/down indicator.

The total length field 368 includes a length indicator (e.g., a number of bytes) corresponding to the amount of data stored in the contiguous number of data segments that store data corresponding to the region. Alternatively, or in addition to, the total length field may include a data total length indicator corresponding to the amount of data stored in all regions associated with the data.

The region hash field 370 includes a deterministic function result of applying a deterministic function to the contiguous number of data segments associated with the region. The deterministic function includes one or more of a hash algorithm (e.g., message digest (MD)-5, secure hash algorithm (SHA)-1, SHA-256, SHA 512), a hash-based message authentication code (HMAC, e.g., HMAC-MD-5), and a mask generating function (MGF). For example, a hash digest entry from performing a MD-5 hashing function over one data segment results when the region includes one data segment. The region hash field may be utilized to determine whether a similar data segment has already been stored in an associated dispersed storage network (DSN) memory.

The SAT 360 may be stored in a local memory associated to enable access to a dispersed storage network (DSN) memory and/or as a SAT data segment in the DSN memory (e.g., as a set of encoded SAT slices). A SAT vault source name is associated with the SAT when the SAT is stored in the DSN memory. At least one SAT associates data to one or more regions of contiguous data segments, wherein each data segment of the one or more contiguous data segments is stored as a set of encoded data slices in a dispersed storage network (DSN) memory. For example, initial storage of a file stuff.txt results in a first region stored in the DSN memory that includes four contiguous data segments of the initial data of stuff.txt and one data segment corresponding to the SAT. Next, an updated revision of the file stuff.txt is stored in the DSN resulting in a second region stored in the DSN memory that includes four more contiguous data segments of appended data of stuff.txt and an updated SAT data segment. The SAT vault source name enables access to all of the encoded data slices associated with the data.

FIG. 15A is a diagram illustrating an example of a slice name 372 format that includes a slice index field 374 and a vault source name field 376. The slice index field 374 includes a slice index entry corresponding to a slice name that may be utilized to produce a pillar number corresponding to a dispersed storage (DS) unit to store an associated encoded data slice. The vault source name field 376 includes a vault source and entry that includes a source name field 378 and a segment number field 380. The source name field 378 includes a source name entry corresponding to the slice name. The segment number field 380 includes a segment number entry that corresponds to a segment identifier (ID) for each segment associated with storing data and/or a segment allocation table (SAT). For example, segment number zero is associated with a SAT and segment number one or higher is associated with a first segment or subsequent segments of a contiguous number of segment numbers associated with regions of data. For instance, a revision 1 SAT (e.g., of a first revision of a data file) is assigned a source name of AAA and a segment number of 0 to produce a vault source name of AAA0 and an affiliated revision 1 data start (e.g., a first segment of data) is associated with the same source name of AAA and a segment number of 1 to produce a vault source name of AAA1. As another instance, a revision 2 SAT (e.g., of a second revision of the data file) is assigned a source name of BBB and a segment number of 0 to produce a vault source name of BBB0 and an affiliated revision 2 new data start (e.g., a new second segment as compared to revision 1) of the data is associated with the source name of BBB and a segment number of 2 to produce a vault source name of BBB2.

The source name field 378 includes a vault ID field 382, a generation field 384, and an object number field 386. The vault ID field 382 includes a vault ID entry that associates a plurality of data as a group of data accessible when access to such a vault is enabled (e.g., a group of data affiliated with an entity such as a user device or a group of user devices) for the slice and. The generation field 384 includes a generation entry that associates a subgroup of data associated with the vault ID entry of the slice name. For example, successive generations may be added over time to organize data into multiple subgroups. The object number field 386 (e.g., a file ID) includes an object number entry of the slice name that identifies the data and may be created based on one or more of a filename, a hash of the data, a hash of the filename, a user ID, a vault ID, and a random number. For example, an object number of a first revision of a data file may be substantially the same as the object number of a second revision of the data file. As another example, the object number of the first revision of the data file may be substantially different than the object number of the second revision of the data file.

FIG. 15B is a diagram illustrating an example of data segmentation that includes a segment allocation table (SAT) 388 and a plurality of consecutive segments 1-4 corresponding to initially storing a first revision of data. The SAT 388 is stored in a dispersed storage network (DSN) memory at a vault source name address of AAA0. The SAT 388 includes a first region with a start segment vault source name field 362 entry of AAA1, a segment size field 364 entry of 100 bytes, a segmentation approach field 366 entry of a fixed segmentation approach, a total length field 368 entry of 100 bytes, and a region hash field 370 entry value of FD5396. The SAT 388 further includes a second region with a start segment vault source name of AAA2, a segment size of 100 bytes, a fixed segmentation approach, a total length of 240 bytes, and a region hash value of 39C2DA. Each segment of the segments 1-4 of the example contain a maximum of 100 bytes in accordance with the segment size of 100 bytes as indicated in both regions of the SAT. A segment 1 is stored in the DSN memory at a vault source name address of AAA1 in accordance with the start segment vault source name AAA1 as indicated in region 1 of the SAT. Segments 2-4 are stored in the DSN memory at vault source name addresses of AAA2-AAA4 in accordance with contiguous segment numbering as indicated in region 2 of the SAT.

FIG. 15C is a diagram illustrating another example of data segmentation that includes a segment allocation table (SAT) 390 and a plurality of consecutive segments 2-5 corresponding to new segments of a second revision of data. The SAT 390 is stored in a dispersed storage network (DSN) memory at a vault source name address of BBB0. The SAT 390 includes two regions, wherein a first region includes segments common to a first revision of the data and the second revision of the data. The first region includes a start segment vault source name of AAA1, a segment size of 100 bytes, a fixed segmentation approach, a total length of 100 bytes, and a region hash of FD5396.

The second region includes a start segment vault source name of BBB2, a segment size of 300 bytes, a fixed segmentation approach, a total length of 1200 bytes, and a region hash of 9274BC. The segments 2-5 each contain a maximum of 300 bytes in accordance with the segment size of 300 bytes as indicated in the SAT region 2. The segments 5-8 each contain 300 bytes in accordance with the total length of 1200 bytes as indicated in the SAT region 2. Segment 2 (e.g., a new segment 2 as compared to a segment 2 of revision 1 of the data) is stored in a dispersed storage network (DSN) memory at a vault source name address of BBB2 in accordance with the start segment vault source name BBB2 as indicated in the SAT region 2. Segments 2-5 are stored in the DSN memory at vault source name addresses of BBB2-BBB5 in accordance with contiguous segment numbering and SAT region 2. Another SAT associated with revision 1 of the data (e.g., as discussed with reference to FIG. 15B) and old segments 2-4 may be deleted when the SAT associated with revision 2 of the data is stored when revision one of the data is no longer required.

Figure 16A:
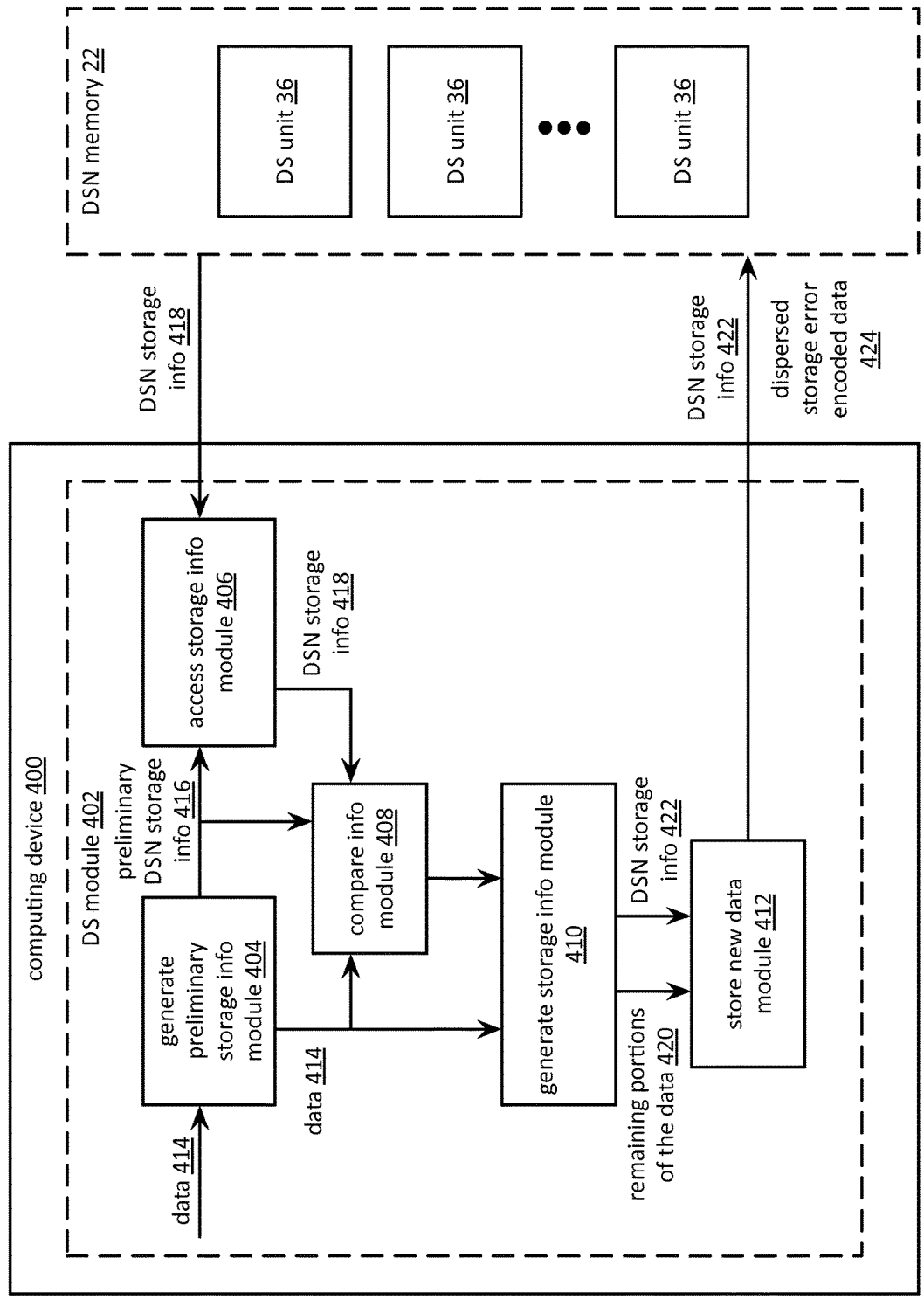
FIG. 16A is a schematic block diagram of another embodiment of a computing system in accordance with the present invention.

FIG. 16A is a schematic block diagram of another embodiment of a computing system that includes a computing device 400 and a dispersed storage network (DSN) memory 22 of a DSN. The distributed storage network memory 22 includes a plurality of dispersed storage (DS) units 36. The computing device 400 includes a DS module 402 and may be implemented as a DS processing unit, a user device, a storage integrity processing unit, and/or a DS managing unit 18 of a DSN. The DS module 402 includes a generate preliminary storage information module 404, an access storage information module 406, a compare information module 408, a generate storage information module 410, and a store new data module 412.

The generate preliminary storage information module 404, when operable within the computing device 400 generates preliminary DSN storage information 416 for data 414 to be stored in a DSN (e.g., in the DSN memory 22). The preliminary DSN storage information 416 includes, for one or more portions (e.g., regions) of the data 414, one or more of deterministic function representations of the data 414, a total length indicator, a segmentation approach, a segment size, and one or more region indicators. For example, the generate preliminary storage information module 404 may generate the preliminary DSN storage information by accessing a lookup using a data identifier (ID) associated with the data 414. As a specific example, the generate preliminary storage information module 404 receives the data ID, associates the data ID with a vault ID, accesses a registry based on the vault ID, and retrieves the segmentation approach and the segment size. As another example, the generate preliminary storage information module 404 may generate the preliminary DSN storage information by receiving the data 414 and analyzing it and/or performing a deterministic function on the data 414.

The generate preliminary storage information module 404 also segments the data 414 into segments in accordance with the preliminary DSN storage information. For example, the generate preliminary storage information module 404 segments the data 414 into a first subset of segments corresponding to a first region and into a second subset of segments corresponding to a second region. The generate preliminary storage information module 404 then performs a deterministic function on segments of the first and second regions to produce a deterministic representation of the first and second regions.

The access storage information module 406, when operable within the computing device 400, accesses DSN storage information 418 regarding other data stored in the DSN. For example, the access storage information module 406 accesses one or more segment allocation tables for the other data. Note that the DSN storage information 418 includes, for one or more portions (e.g., regions) of the other data, one or more of deterministic function representations of the other data, a total length indicator of the other data, a segmentation approach of the other data, a segment size of the other data, and one or more region indicators of the other data.

As another example, the access storage information module 406 identifies a relationship between the data 414 and the other data and accessing the DSN storage information 418 of the other data based on the relationship. Note that the relationship includes a same data ID, a same requesting entity ID, a same user ID, a same vault ID, and/or a same group of users.

The compare information module 408, when operable within the computing device 400, compares the preliminary DSN storage information 416 for the data 414 with the DSN storage information 418 regarding the other data. For example, the compare information module 408 generates deterministic function representations of the data 414 and compares it with the deterministic function representations of the other data. When the comparison is favorable (e.g., substantially similar), the compare information module 414 indicates that the preliminary DSN storage information 416 is comparable to the DSN storage information 418 of the other data.

The generate storage information module 410, when operable within the computing device 400, generates DSN storage information for remaining portions of the data 420 when the comparison result was favorable. The module 410 also generates DSN storage information 422 for the data 414 based on the DSN storage information of the other data and the remaining portions DSN storage information. For example, the generate storage information module 410 generates the DSN storage information 420 for the data by associating at least the portion of the data with the DSN storage information of at least the portion of the other data. As a specific example, the generate storage information module 410 utilizes a segment allocation table of the DSN storage information of at least the portion of the other data as a segment allocation table for at least a portion of the data.

As another example, the generate storage information module 410 generates the DSN storage information 420 for the data by creating a segment allocation table that includes data portioning information for the portions of the data and deterministic function representations of the portions of the data, wherein the portions of the data include the at least the portion of the data and the remaining portions of the data 420. As a specific example, the generate storage information module 410 generates a new region entry of DSN storage information for the remaining portions of the data 420, wherein the new region entry is included in the segment allocation table.

The store new data module 412, when operable within the computing device 400, dispersed storage error encodes the remaining portions of the data 420 to produce dispersed storage error encoded data 424. The store new data module 412 also outputs the DS encoded data 424 for storage in the DSN memory 22 in accordance with the remaining portions DSN storage information. For example, the store new data module 412 segments the remaining portions of the data 420 in accordance with the remaining portions DSN storage information (e.g., segment size, segmentation approach) to produce a plurality of segments, encodes each segment of the rally of segments utilizing a dispersed storage error coding function to produce a plurality of sets of encoded data slices, and for each plurality of sets of encoded data slices, outputting the plurality of sets of encoded data slices to the DSN memory 22 for storage therein.

Figure 16B:
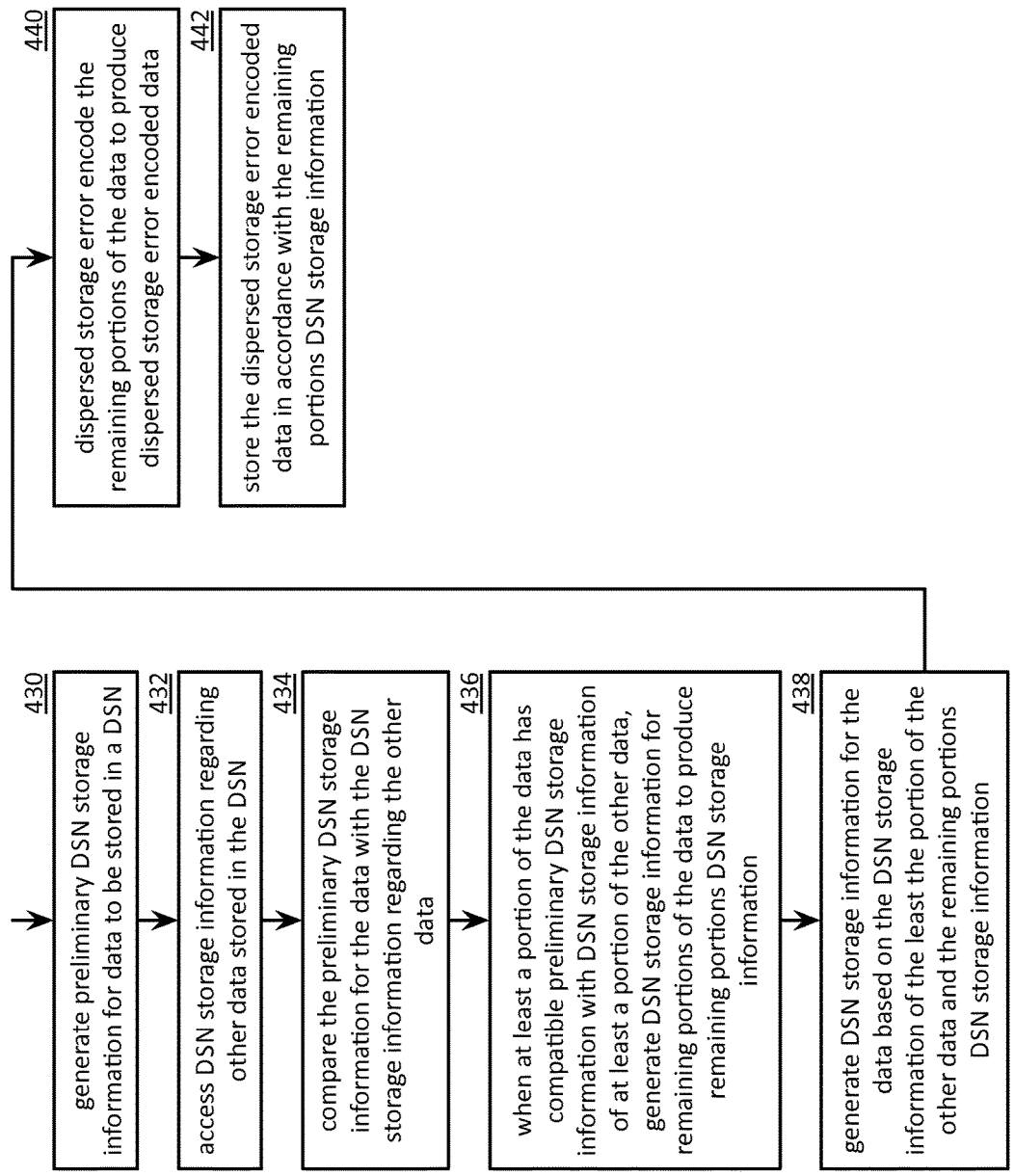
FIG. 16B is a flowchart illustrating an example of storing segmented data in accordance with the present invention.

FIG. 16B is a flowchart illustrating an example of storing segmented data. The method begins at step 430 where a processing module (e.g., of a dispersed storage (DS) processing unit of a dispersed storage network (DSN)) generates preliminary dispersed storage network (DSN) storage information for data to be stored in a DSN. The method continues at step 432 where the processing module accesses DSN storage information regarding other data stored in the DSN. The accessing DSN storage information of the other data includes accessing one or more segment allocation tables for the other data, wherein a segment allocation table of the one or more segment allocation tables includes data portioning information for portions of the other data and deterministic function representations of the portions of the other data. The accessing DSN storage information of the other data further includes identifying a relationship between the data and the other data and accessing the DSN storage information of the other data based on the relationship.

The method continues at step 434 where the processing module compares the preliminary DSN storage information for the data with the DSN storage information regarding the other data. The comparing further includes generating deterministic function representations of the data and comparing the deterministic function representations of the data with the deterministic function representations of the portions of the other data. The comparing further includes segmenting the data into a plurality of segments in accordance with at least one of the pulmonary DSN storage information and the DSN storage information regarding the other data. For example, the processing module compares a hash digest of a first region of the data (e.g., a message digest 5 hash over 25 data segments of the region) to a first region hash digest associated with the other data (e.g., from a segment allocation table retrieved from the DSN).

When at least a portion of the data has compatible preliminary DSN storage information with DSN storage information of at least a portion of the other data, the method continues at step 436 where the processing module generates DSN storage information for remaining portions of the data to produce remaining portions DSN storage information, wherein the at least the portion of the data includes one or more of the plurality of segments. The method continues at step 438 where the processing module generates DSN storage information for the data based on the DSN storage information of the at least the portion of the other data and the remaining portions DSN storage information.

The generating the DSN storage information for the data further includes associating the at least the portion of the data with the DSN storage information of the at least the portion of the other data. The generating the DSN storage information for the data further includes creating a segment allocation table that includes data portioning information for the portions of the data and deterministic function representations of the portions of the data, wherein the portions of the data include the at least the portion of the data and the remaining portions of the data. For example, the processing module creates a new region entry including a start segment vault source name, a segment size, a segmentation approach, a total length of the remaining portions of data, and a region hash digest over one or data segments of the region as the deterministic function representation. The method continues at step 440 where the processing module dispersed storage error encodes the remaining portions of the data to produce dispersed storage error encoded data. The method continues at step 442 where the processing module stores the dispersed storage error encoded data in accordance with the remaining portions DSN storage information.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method comprises:

issuing, by a requesting entity, a rebuild request regarding an encoded data slice to a set of distributed storage (DS) units, wherein a data segment of data is dispersed storage error encoded to produce a set of encoded data slices, wherein the set of encoded data slices includes the encoded data slice, wherein the data segment is reconstructable from a decode threshold number of encoded data slices of the set of encoded data slices, and wherein the encoded data slice is corrupted or lost;

in response to the rebuild request, generating, by each of at least some of the DS units of the set of DS units, a partial slice corresponding to the encoded data slice based on another encoded data slice of the set of encoded data slices stored by the respective DS unit to produce an array of partial slices;

encrypting, by the at least some of the DS units, the array of partial slices using a set of encryption keys, wherein each encryption key of the set of encryption keys is used 2*n times to produce an array of encrypted partial slices, where n is an integer greater than or equal to 1; and rebuilding, by the requesting entity, the encoded data slice from the array of encrypted partial slices.

2. The method of claim 1, wherein the encrypting comprises:

arranging, when n equals 1, the at least some of DS units into DS unit pairings, wherein each DS unit of a DS unit pairing uses a same encryption key of the set of encryption keys.

3. The method of claim 2 further comprises:

for the DS unit pairing:

generating, by the DS units of the DS unit pairing, a shared secret; and generating, by each of the DS units of the DS unit pairing, the same encryption key based on the shared secret.

4. The method of claim 1, wherein the encrypting comprises:

pairing, when n equals 1 and the at least some of the DS units includes an odd number of DS units, one of the at least some of DS units with two other DS units of the at least some of DS units to use a first encryption key of the set of encryption keys; and arranging remaining DS units of the at least some of DS units into DS unit pairings, wherein each DS unit of a DS unit pairing uses a same encryption key of the set of encryption keys, wherein the remaining DS units includes the two other DS units.

5. The method of claim 1, wherein the encrypting comprises:
   exclusive ORing, by a DS unit of the at least some of the DS units, a partial slice of the array of partial slices with an encryption key of the set of encryption keys to produce an encrypted partial slice of the array of encrypted partial slices.

6. The method of claim 5, wherein the rebuilding comprises:
   exclusive ORing the array of encrypted partial slices to produce the encoded data slice.

7. The method of claim 1, wherein the rebuilding comprises:
   decrypting the array of encrypted partial slices based on the set of encryption keys to produce the array of partial slices; and
   decoding the array of partial slices to rebuild the encode data slice.

8. The method of claim 1, wherein the requesting entity comprises:
   a DS unit of the set of DS units, wherein the DS unit is to store the encoded data slice to be rebuilt.

9. The method of claim 1, wherein the encrypting comprises:
   assigning multiple encryption keys of the set of encryption keys to a DS unit of the at least some of DS units; and
   assigning each of the multiple encryption keys to another DS unit of the at least some of DS units.

10. The method of claim 1, wherein the encrypting comprises:
    encrypting, by a first DS unit of the at least some of the DS units, a first partial slice of the array of partial slices using a first encryption key of the set of encryption keys to produce a first encrypted partial slice;
    encrypting, by a second DS unit of the at least some of the DS units, a second partial slice of the array of partial slices using a second encryption key of the set of encryption keys to produce a second encrypted partial slice; and
    exclusive ORing, by the first or the second DS unit, the first encrypted partial slice and the second encrypted partial slice to produce a combined encrypted partial slice.

11. A dispersed storage (DS) module comprises:
    a first module, when operable within a computing device, causes the computing device to receive a rebuild request regarding an encoded data slice, wherein a data segment of data is dispersed storage error encoded to produce a set of encoded data slices, wherein the set of encoded data slices includes the encoded data slice, wherein the data segment is reconstructable from a decode threshold number of encoded data slices of the set of encoded data slices, and wherein the encoded data slice is corrupted or lost;
    a second module, when operable within the computing device, causes the computing device to generate a partial slice corresponding to the encoded data slice based on another encoded data slice of the set of encoded data slices stored by a DS unit that includes the DS module; and
    a third module, when operable within the computing device, causes the computing device to encrypt the partial slice using an encryption key of a set of encryption keys to produce an encrypted partial slice, wherein the encryption key is used by another DS module of another DS unit to produce another encrypted partial slice.

12. The DS module claim 11, wherein the third module is further operable to:
    generate, in conjunction with the other DS module, a shared secret; and
    generate the encryption key based on the shared secret.

13. The DS module claim 11, wherein the third module is further operable to:
    exclusive OR the partial slice with the encryption key of the set of encryption keys to produce the encrypted partial slice.

14. The DS module claim 11, wherein the third module is further operable to:
    assign multiple encryption keys of the set of encryption keys to the DS module, wherein each of the multiple encryption keys is used by another DS unit of a plurality of DS units.

15. The DS module claim 11, wherein the third module is further operable to:
    encrypt a first partial slice of an array of partial slices using a first encryption key of the set of encryption keys to produce a first encrypted partial slice; and
    exclusive OR the first encrypted partial slice and a second encrypted partial slice to produce a combined encrypted partial slice, wherein another DS module encrypts a second partial slice of the array of partial slices using a second encryption key of the set of encryption keys to produce the second encrypted partial slice.

* * * * *